US009813117B2

(12) United States Patent
Shraga et al.

(10) Patent No.: US 9,813,117 B2
(45) Date of Patent: Nov. 7, 2017

(54) IN VEHICLE INDUCTIVE POWER PROVISION SYSTEM AND METHOD

(75) Inventors: Rotem Shraga, Kiryat Ono (IL); Arye Nudelman, Jerusalem (IL); Ilya Gluzman, Holon (IL); Assaf Gad, Holon (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 911 days.

(21) Appl. No.: 14/127,433

(22) PCT Filed: Jun. 21, 2012

(86) PCT No.: PCT/IL2012/050214
§ 371 (c)(1),
(2), (4) Date: Mar. 27, 2014

(87) PCT Pub. No.: WO2012/176206
PCT Pub. Date: Dec. 27, 2012

(65) Prior Publication Data
US 2014/0312686 A1    Oct. 23, 2014

Related U.S. Application Data

(60) Provisional application No. 61/499,394, filed on Jun. 21, 2011, provisional application No. 61/499,410, filed on Jun. 21, 2011.

(51) Int. Cl.
*B60L 1/00*    (2006.01)
*B60L 3/00*    (2006.01)
(Continued)

(52) U.S. Cl.
CPC .......... *H04B 5/0037* (2013.01); *B60R 16/03* (2013.01); *H01F 38/14* (2013.01); *H02J 5/00* (2013.01); *H02J 5/005* (2013.01); *H02J 7/025* (2013.01)

(58) Field of Classification Search
CPC .. G06F 7/04; G06F 7/00; G06F 17/00; H04Q 5/22; H04B 5/00; H02J 5/00; H02J 17/00
(Continued)

(56) References Cited

U.S. PATENT DOCUMENTS

| 8,527,688 B2* | 9/2013 | Chatterjee | ............. G06F 1/1632 336/221 |
| 8,954,001 B2* | 2/2015 | Chatterjee | ............... H02J 5/005 307/104 |

(Continued)

FOREIGN PATENT DOCUMENTS

WO    2008137996 A1    11/2008

OTHER PUBLICATIONS

International Search Report dated Sep. 2, 2013, for corresponding PCT Application PCT/IL2012/050214.
(Continued)

*Primary Examiner* — Rexford Barnie
*Assistant Examiner* — Jagdeep Dhillon
(74) *Attorney, Agent, or Firm* — William Dippert; Laurence Greenberg; Werner Stemer

(57) ABSTRACT

A vehicle inductive power assembly and method for transferring electrical power inductively to an electrical device, in a motorized vehicle. The system includes an inductive power transfer system which is configured to provide the electrical power to the electrical device as well as a communications security system which is configured to establish a secure communications channel between the inductive power transfer system and the electrical device. Following activation of the inductive power transfer system, the communications security system initiates a handshaking procedure between the inductive power transfer system and the electrical device. If the handshaking procedure is successful the communications security system instructs the inductive (Continued)

power transfer system to commence providing the electrical power to the electrical device.

24 Claims, 11 Drawing Sheets

(51) Int. Cl.
| | | |
|---|---|---|
| *H02G 3/00* | (2006.01) | |
| *H04B 5/00* | (2006.01) | |
| *H02J 5/00* | (2016.01) | |
| *H02J 7/02* | (2016.01) | |
| *B60R 16/03* | (2006.01) | |
| *H01F 38/14* | (2006.01) | |

(58) Field of Classification Search
USPC ....... 307/10.1, 9.1, 10.2, 10.6, 104, 149, 80, 307/66, 84, 82; 710/303, 305, 301; 701/22, 45, 2; 380/277; 340/10.1, 10.2; 455/41.2, 41.1, 41.3
See application file for complete search history.

(56) References Cited

U.S. PATENT DOCUMENTS

| | | | | |
|---|---|---|---|---|
| 9,331,495 | B2* | 5/2016 | Soar | ........................... F41G 1/34 |
| 2005/0007067 | A1 | 1/2005 | Baarman | |
| 2008/0282817 | A1* | 11/2008 | Breed | .................... B60C 11/24 73/865.9 |
| 2010/0007805 | A1* | 1/2010 | Vitito | ..................... B60K 35/00 348/837 |
| 2010/0305779 | A1* | 12/2010 | Hassan | ................... G01C 17/38 701/2 |
| 2011/0018498 | A1* | 1/2011 | Soar | .......................... B60N 2/44 320/108 |
| 2011/0043327 | A1* | 2/2011 | Baarman | ................. H02J 5/005 340/5.8 |
| 2011/0050164 | A1* | 3/2011 | Partovi | .................... H01F 5/003 320/108 |
| 2011/0185196 | A1* | 7/2011 | Asano | ................. B60L 11/1809 713/300 |
| 2011/0200193 | A1* | 8/2011 | Blitz | ..................... H04L 9/3271 380/277 |
| 2011/0210831 | A1* | 9/2011 | Talty | .................. H04B 5/0031 340/10.51 |
| 2011/0238988 | A1* | 9/2011 | Tanaka | ...................... H04L 9/32 713/168 |
| 2012/0218078 | A1* | 8/2012 | Hill | .................... G07C 9/00087 340/5.82 |

OTHER PUBLICATIONS

Written Opinion dated Dec. 23, 2013, for corresponding PCT Application PCT/IL2012/050214.
International Preliminary Report on Patentability dated Dec. 23, 2013, for corresponding PCT Application PCT/IL2012/050214.

* cited by examiner

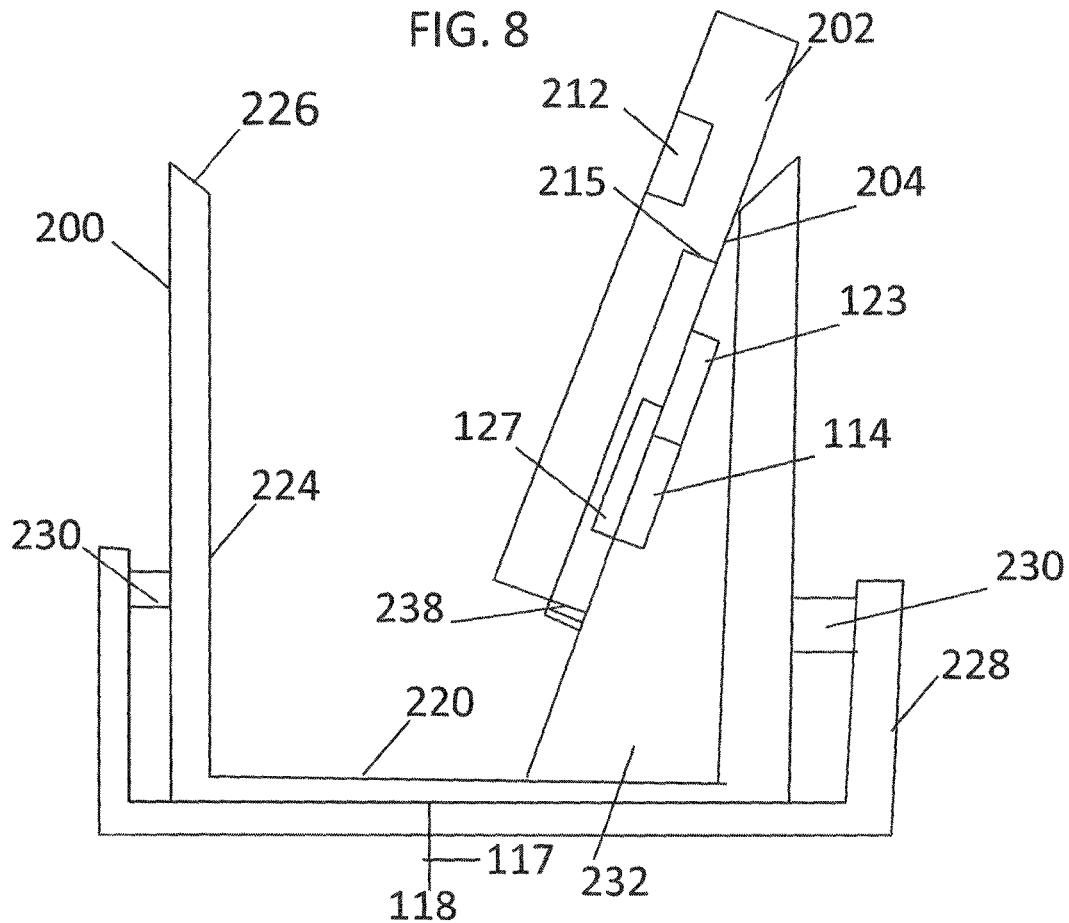
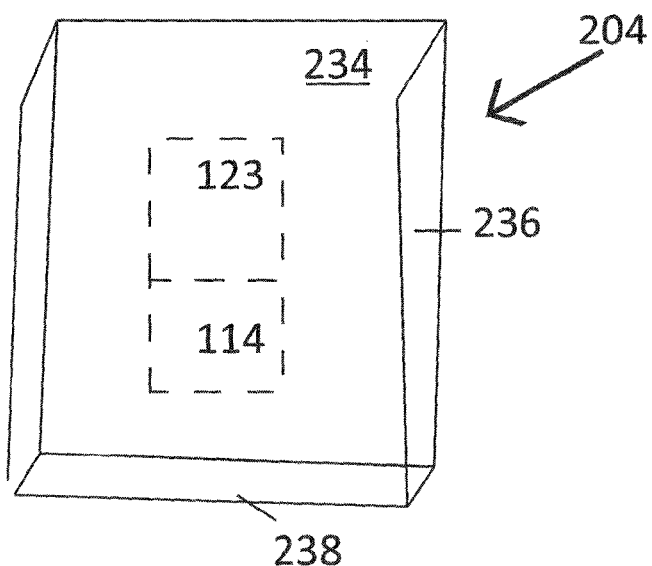

IN VEHICLE INDUCTIVE POWER PROVISION SYSTEM AND METHOD

CROSS-REFERENCE TO RELATED APPLICATION

This application is the U.S. national phase of PCT Application No. PCT/IL2012/050214 filed on Jun. 21, 2012, which claims the benefit of U.S. Provisional Application No. 61/499,394 filed on Jun. 21, 2011 and, U.S. Provisional Application No. 61/499,410 filed on Jun. 21, 2011 the disclosures of which are incorporated in their entirety by reference herein.

FIELD OF THE DISCLOSURE

The present disclosure relates to systems and methods for transferring electrical power inductively from an inductive power transfer system to an electrical device, in a motorized vehicle.

BACKGROUND OF THE DISCLOSURE

The use of inductive power supply systems in automobiles or other types of motorized vehicles, is known in the art. The inductive power supply systems provide power systems for clean and environmentally-friendly transportation vehicle.

The inductive power supply systems provide electrical power transfer without sparking effects due to contact problems and the inductive power systems are rugged against dust and environmental conditions.

The inductive transfer of electric power to an electrical device is based on the use of an alternating magnetic field generated by a secondary coil inductively coupled to a primary coil. Thus, electrical power is wirelessly transferred to the secondary coil without moving parts.

Current inductive power systems do not include devices and methods for protecting the use of the inductive power supply system by non-registered and illegal users thereof. This can lead to the abuse of electrical devices which receive electrical power from an inductive power supply system.

The prior art device does not describe using a secure vehicle inductive power supply system for supplying electrical power to an electrical device located in the vehicle.

SUMMARY OF THE DISCLOSURE

The present disclosure provides systems and methods for securely transferring electrical power inductively from an inductive power transfer system to an electrical device, in a motorized vehicle. The present disclosure includes, inter alia, a communications security system which is configured to establish a secure communications channel between the inductive power transfer system and the electrical device. The secure communications channel ensures that only registered and legal users of the motorized vehicle and/or the electrical device are enabled to transfer electrical power and confidential data, such as confidential business data and personal financial data, between the inductive power supply system and the electrical device. The secure communications channel prevents pirate and illegal users for transferring electrical power to the electrical device as well as obtaining access to the confidential data and misusing the data, which are stored in the electrical device.

Typically, the electrical device includes, inter alia, devices, such as a mobile communications device, a vehicle inductive power transfer container, a vehicle inductive thermal cup, a vehicle onboard fan, a navigation system, a hands-free microphone, a computing device, such as a laptop computer, a fluid cooling unit and any combination thereof.

In order to execute the transfer of electrical power and data, the communications secure system establishes a secure communications channel between the inductive power supply system and the electrical device by using a handshaking procedure. The handshaking procedure is typically performed by using a secure handshaking protocol, such as a Bluetooth protocol or a WiFi protocol.

The inductive power transfer system, which is electrically coupled to a vehicle power supply interface, provides electrical power to the inductive power transfer system. The inductive power supply system includes, inter alia, an inductive power outlet unit, which is associated with the vehicle, is inductively coupled to an inductive power receiver unit. The inductive power receiver unit is associated with the electrical device.

The inductive power outlet unit, which includes, inter alia, a primary coil and a driver unit of the power supply, is integrated to the vehicle charging frame. An inductive power supply unit including, inter alia, a secondary coil is inductively coupled to the primary coil of the power outlet unit upon activating the vehicle power supply interface. The vehicle power supply interface supplies electrical power to the inductive power transfer system which establishing an inductive magnetic circuit between the inductive power outlet unit and the inductive power supply unit.

Alternatively, the inductive magnetic coupling and the inductive magnetic circuit is established upon installing the electrical device in the vehicle charging frame.

In order to provide a secure communications link between the inductive power transfer system and the electrical device upon activating the inductive power transfer system, the communications security system initiates the handshaking procedure between the inductive power transfer system and said electrical device.

In order to perform the handshake procedure, Near-Field Communication (NFC) tags are associated with the inductive power supply system and the electrical device. A first NFC tag is associated with the inductive power transfer unit and a second NFC tag associated with the electrical device. The first NFC tag and the second NFC tag perform the handshaking procedure between said inductive power supply system and said electrical device.

In order to proceed with the handshaking procedure, typically, the first NFC tag performs a Bluetooth search procedure seeking a corresponding Bluetooth device in order to perform a pairing relationship.

If the handshaking procedure is successful, the communications security system establishes the secure communications channel between the power transfer system and the electrical device. The inductive power transfer system commences to supply electrical power to the electrical device. In addition, transfer data, such as confidential personal and financial, which are typically stored in the electrical device, are transferred between the electrical device and the vehicle. The data transfer is performed using a secure Bluetooth communications channel or a secure WiFi communications channel.

On establishment of the secure communications channel and the transfer of data between the electrical device and the power transfer supply system, a user and/or driver is enabled to perform various additional functions. For example, the driver may pay road toll fees by means of a data exchange between a transponder installed in the vehicle and a toll-fee checking station, without the necessity of driver stopping at the toll-fee checking station.

In accordance with a further embodiment of the present disclosure, the inductive power supply provides electrical power to a vehicle inductive container for transferring electrical power and data between the inductive power supply system and the electrical device. The vehicle inductive container provides a further device for providing a communications link between the power supply system and the electrical device. The inductive container has the required geometry and shape to reside in the vehicle beverage cup holder.

The inductive container includes an inductive power outlet unit installed in an electrical device support unit of the inductive container, which is inductively coupled to an inductive power receiver unit associated with the electrical device. The electrical device support unit is constructed of a magnetic permeable material and is shaped to support the electrical device, such as a mobile communications device.

On activation of the inductive power assembly, a secure communications channel is established between the inductive power supply system and the electrical device, as described in above. Upon a successful handshaking procedure, electrical power is supplied to the electrical device residing in the inductive container as well as the transfer of data between the inductive power supply system and the electrical device.

In accordance with a further embodiment of the present disclosure, the vehicle induction power assembly is adapted to inductively supply electrical power to a thermal cup, residing in the vehicle beverage cup holder. The thermal cup includes, inter alia, a thermoelectric element for thermally conditioning a beverage contained in a beverage container, which is configured to reside in the thermal cup. The thermal cup receives electrical power from the inductive power transfer system.

On activation of the power supply assembly, electrical power is supplied to the thermal cup and the thermal cup provides thermal conditioning of the beverage in accordance with a user-selected and/or required beverage temperature. The user thereof is able to select at least one of the following temperature options:

The beverage is heated to the required beverage temperature;

The beverage is cooled to the required beverage temperature;

The beverage temperature is maintained at the required beverage temperature, and The beverage temperature is maintained at the current beverage temperature.

The thermal also includes heat dissipating means for maintaining the thermal cup at the required thermal conditions.

There is provided in accordance with a selected embodiment of the present disclosure, in a motorized vehicle, a vehicle induction power assembly for transferring electrical power inductively to an electrical device including an inductive power transfer system configured to provide the electrical power to the electrical device, and a communications security system configured to establish a secure communications channel between the inductive power transfer system and the electrical device. Upon activating the inductive power transfer system, the communications security system initiates a handshaking procedure between the inductive power transfer system and the electrical device whereupon if the handshaking procedure is successful the communications security system instructs the inductive power transfer system to commence providing the electrical power to the electrical device.

There is also provided in accordance with a selected embodiment of the present disclosure, in a motorized vehicle, a method for transferring electrical power from a vehicle induction power assembly to an electrical device including: providing an inductive power transfer system configured to supply the electrical power to the electrical device, providing a communications security system configured to establish a secure communications channel between the inductive power transfer system and the electrical device, initiating a handshaking procedure between the inductive power transfer system and the electrical device via a secure communications channel and activating the inductive power transfer system to supply the electrical power, to the electrical device, if the handshaking procedure is successful.

Further in accordance with a selected embodiment of the present disclosure, the communications security system includes a data transfer signal generator for generating a data transfer commencement signal.

Still further in accordance with a selected embodiment of the present disclosure, the secure communications channel includes a secure data transfer channel for transferring the data transfer commencement signal from data transfer signal generator to the inductive power transfer device.

Additionally in accordance with a selected embodiment of the present disclosure, the communications security system includes: a first NFC tag associated with the inductive power transfer unit, the inductive power transfer unit includes at least one primary inductor and at least one driving unit, the driving unit being operable to generate a varying electrical potential across the primary inductor and the primary inductor being configured to inductively couple with a secondary inductor associated with the electrical device such that the electrical power is transferred to the electrical device, and a second NFC tag associated with the electrical device. The first NFC tag and the second NFC tag perform the handshaking procedure between the inductive power supply system and the electrical device. Following the successful handshake between the first NFC tag and the second NFC tag, the communications security system instructs the data transfer signal generator to generate the data transfer commencement signal.

Further in accordance with a selected embodiment of the present disclosure, activating includes locating an inductive power receiver unit in magnetically-inductive proximity to an inductive power outlet unit whereupon the inductive power transfer system generates the electrical power.

Additionally or alternatively, activating includes a user activating a switching unit for conductively linking a vehicle power supply to the inductive power transfer device whereupon the inductive power system generates the electrical power.

Still further in accordance with a selected embodiment of the present disclosure the motorized vehicle includes a vehicle communications notification device for notifying a user of at least one data transfer operation.

Additionally the vehicle communications notification device includes a visual display system for visually notifying the user of the at least one data transfer operation, the at least one data transfer operation including at least one of the following: commencing providing the electrical energy to the electrical device, proceeding providing the electrical energy to the electrical device and/or terminating providing the electrical energy to the electrical device.

Additionally or alternatively, the vehicle communications notification device includes an audio signal generation system for audible notifying the user of the at least one data transfer operation, the at least one data transfer operation including at least one of the following: commencing providing the electrical energy to the electrical device, proceeding providing the electrical energy to the electrical device and/or terminating providing the electrical energy to the electrical device.

Further in accordance with a selected embodiment of the present disclosure, following completion of the electrical charging operation, the data transfer signal generator generates a data transfer termination signal for transferring to the inductive power transfer device via the secure data transfer channel.

Still further in accordance with a selected embodiment of the present disclosure, the at least one data transfer operation includes transferring at least one of the following data: a vehicle location, vehicle registration data, a vehicle travel log, vehicle servicing data, the user identity data, the user health data and any combination thereof.

Additionally in accordance with a selected embodiment of the present disclosure the motorized vehicle further includes a transponder coupled to the vehicle communications notification device and a vehicle service provider for facilitating payment of vehicle usage fees by the user, the vehicle service provider is selected from the group consisting of a parking lot fee provider, a vehicle road toll provider and any combination thereof.

Further in accordance with a selected embodiment of the present disclosure, the electrical device is selected from the group consisting of: a mobile communications device, a vehicle inductive power transfer container, a vehicle inductive thermal cup, an onboard fan, a navigation system, a hands-free microphone, a computer, a cooler unit and any combination thereof.

Still further in accordance with a selected embodiment of the present disclosure, the electrical device is accommodated in a holding sleeve or in an inductive holding container.

Additionally in accordance with a selected embodiment of the present disclosure, the secure communications channel is selected from the group consisting of a Bluetooth communications channel, a WiFi communications channel, a LAN network channel and an Ethernet network channel.

There is provided in accordance with another selected embodiment of the present disclosure, in a motorized vehicle, a vehicle induction power assembly for transferring electrical power inductively to an electrical device including: an inductive container inductively integrated with the electrical device, an inductive power transfer system configured to supply the electrical power to the electrical device by means of the inductive container and a communications security system configured to establish a secure communications channel between the inductive power transfer system and the inductive container. Upon activating the inductive power transfer system, the communications security system initiates a handshaking procedure between the inductive power transfer system and the inductive container whereupon if the handshaking procedure is successful the communications security system instructs the inductive power transfer system to commence supplying the electrical power to the electrical device by means of the inductive container.

There is provided in accordance with yet another selected embodiment of the present disclosure, in a motorized vehicle, a method for transferring electrical power from a vehicle induction power assembly to an electrical device including: inductively integrating an inductive container with the electrical device, configuring an inductive power transfer system to supply the electrical power to the electrical device by means of the inductive container, configuring a communications security system to establish a secure communications channel between the inductive power transfer system and the inductive container, initiating a handshaking procedure between the inductive power transfer system and the inductive container via a secure communications channel and activating the inductive power transfer system to supply the electrical power to the electrical device by means of the inductive container, if the handshaking procedure is successful.

Further in accordance with a selected embodiment of the present disclosure, the communications security system includes a data transfer signal generator for generating a data transfer commencement signal.

Still further in accordance with a selected embodiment of the present disclosure, the secure communications channel includes a secure data transfer channel for transferring the data transfer commencement signal from data transfer signal generator to the inductive power transfer system.

Additionally in accordance with a selected embodiment of the present disclosure, the communications security system includes: a first NFC tag associated with the inductive power transfer system, the inductive power transfer system includes at least one primary inductor and at least one driving unit, the driving unit being operable to generate a varying electrical potential across the primary inductor and the primary inductor being configured to inductively couple with a secondary inductor associated with the inductive container such that the electrical power is transferred to the electrical device by means of the inductive container, and a second NFC tag associated with the inductive container device. The first NFC tag and the second NFC tag perform the handshaking procedure between the power supply system and the electrical device.

Further in accordance with a selected embodiment of the present disclosure, following the successful handshake between the first NFC tag and the second NFC tag, the communications security system instructs the data transfer signal generator to generate the data transfer commencement signal.

Still further in accordance with a selected embodiment of the present disclosure, the activating includes locating an inductive power receiver unit in magnetically-inductive proximity to an inductive power outlet unit whereupon the inductive power transfer system generates the electrical power.

Additionally in accordance with a selected embodiment of the present disclosure, the activating includes a user activating a switching unit for conductively linking a vehicle power supply interface to the inductive power transfer device whereupon the inductive power system generates the electrical power.

Further in accordance with a selected embodiment of the present disclosure, the motorized vehicle includes a vehicle communications notification device for notifying a user of at least one data transfer operation.

Still in accordance with a selected embodiment of the present disclosure, the vehicle communications notification device includes a visual display system for visually notifying the user of the at least one data transfer operation, the at least one data transfer operation including at least one of the following: commencing providing the electrical energy to the electrical device, proceeding providing the electrical energy to the electrical device and terminating providing the electrical energy to the electrical device.

Additionally or alternatively, the vehicle communications notification device includes an audio signal generation system for audible notifying the user of the at least one data transfer operation, the at least one data transfer operation including at least one of the following: commencing providing the electrical energy to the electrical device, proceeding providing the electrical energy to the electrical device and/or terminating providing the electrical energy to the electrical device.

Further in accordance with a selected embodiment of the present disclosure, following completion of the electrical charging operation, the data transfer signal generator generates a data transfer termination signal for transferring to the inductive power transfer device via the secure data transfer channel.

Still further in accordance with a selected embodiment of the present disclosure, the at least one data transfer operation includes transferring at least one of the following data: a vehicle location, vehicle registration data, a vehicle travel log, vehicle servicing data, the user identity data, the user health data and any combination thereof.

Additionally in accordance with a selected embodiment of the present disclosure, the motorized vehicle further includes a transponder coupled to the vehicle communications notification device and a vehicle service provider for facilitating payment of vehicle usage fees by the user, the vehicle service provider is selected from the group consisting of a parking lot fee provider, a vehicle road toll provider and any combination thereof.

Further in accordance with a selected embodiment of the present disclosure, the electrical device is accommodated in the inductive container.

Still further in accordance with a selected embodiment of the present disclosure, the secure communications channel is selected from the group consisting of a Bluetooth communications channel, a WiFi communications channel, a LAN network channel and an Ethernet network channel.

There is provided in accordance with a further selected embodiment of the present disclosure, in a motorized vehicle, a vehicle induction power assembly for supplying electrical power inductively to a thermal cup including: a thermoelectric element integrated with the thermal cup and being operative to thermally condition a beverage associated with the thermal cup and an inductive power transfer system configured to supply the electrical power to the thermoelectric element. Upon activating the inductive power transfer system, the inductive power transfer system supplies the electrical power to the thermoelectric element thereby temperature conditioning the beverage according to a required beverage temperature.

There is provided in accordance with yet a further embodiment of the present disclosure, in a motorized vehicle, a method for a vehicle induction power assembly inductively supplying electrical power to a thermal cup including: integrating a thermoelectric element with the thermal cup, configuring an inductive power transfer system to supply the electrical power to the thermoelectric element and operating the thermoelectric element to thermally condition a beverage contained in the thermal cup thereby temperature conditioning the beverage according to a required beverage temperature.

Further in accordance with a selected embodiment of the present disclosure, the temperature conditioning includes at least one of the following operations: heating the beverage to the required beverage temperature, cooling the beverage to the required beverage temperature, maintaining the beverage temperature at the required beverage temperature and/or maintaining the beverage temperature at a current beverage temperature.

Still further in accordance with a selected embodiment of the present disclosure, further including an air channel located between an outer wall of the thermal cup and an inner wall of the thermal cup for applying cooling air between the outer shell and the inner shell thereby cooling a heat sink associated with the thermoelectric element.

Additionally in accordance with a selected embodiment of the present disclosure, further including an air pump for supplying the cooling air to the air channel.

Further in accordance with a selected embodiment of the present disclosure, further including a heat sink associated with the thermoelectric element for dissipating heat generated by the thermoelectric element.

Still further in accordance with a selected embodiment of the present disclosure, further including a pivotable gripping handle for thermally sealing a beverage container containing the beverage in the thermal cup.

Additionally in accordance with a selected embodiment of the present disclosure, the pivotable gripping handle includes an air pump for supplying cooling air to the thermoelectric element via an air channel associated with the pivotable gripping handle.

Still further in accordance with a selected embodiment of the present disclosure, further including a thermostat associated with the thermal cup and configured to determine a beverage temperature and modifying the electrical power supplied to the thermal cup such that the beverage temperature complies with the required beverage temperature.

BRIEF DESCRIPTION OF THE DRAWINGS

A selected embodiment of the current disclosure is described hereinbelow with reference to the following drawings:

FIG. 8 presents a cross-sectional view of the inductive container for accommodating the electrical device, such as a mobile communications device, in accordance with another selected embodiment of the present disclosure;

FIG. 9 presents details of the electrical device support platform, in accordance with another selected embodiment of the present disclosure;

DETAILED DESCRIPTION OF SELECTED

Figure 1:
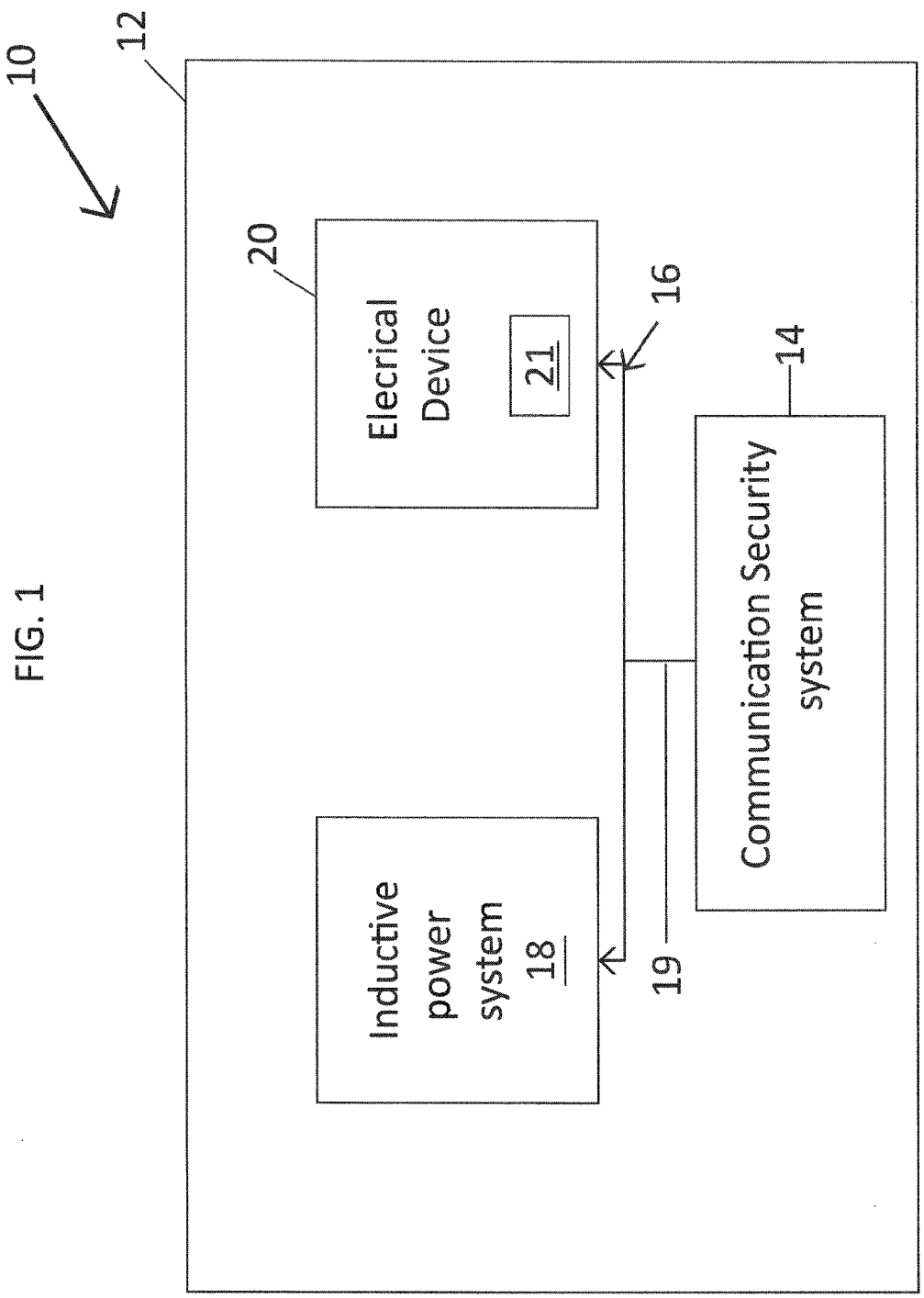
FIG. 1 shows a vehicle induction power assembly installed in a motorized vehicle, in accordance with a selected embodiment of the present disclosure.

Reference is now made to FIG. 1, which shows a vehicle induction power assembly 10 which may be installed in a motorized vehicle 12, such as a car for example, in accordance with a selected embodiment of the present disclosure. The vehicle induction power assembly 10 includes, inter alia, a communications security system 14 for establishing a secure communications channel 16 between an inductive power transfer unit 18 and an electrical device 20, thereby enabling the inductive power transfer unit 18 to provide electrical power to an electrical device 20 by means of a secure communications link 17. The communications security system 14 communicates with the secure communications link 17 via a secure communications link 19. The electrical device 20 typically includes a visual and/or an audio notification system 21 for informing a user of the status of the electrical transfer procedure as well as additional notifications, as described below.

Optionally, the electrical device 20 includes, inter alia, devices, such as a mobile communications device, a vehicle inductive power transfer container, a vehicle inductive thermal cup, a vehicle onboard fan, a navigation system, a hands-free microphone, a computing device, such as a laptop computer, a fluid cooling unit and any combination thereof.

It is appreciated that the inductive power supply assembly 18 is RF-isolated so as to prevent high frequency RF interference with vehicle systems, such as vehicle computer systems as well as RF-sensitive components contained in the electrical device 10.

Figure 2:
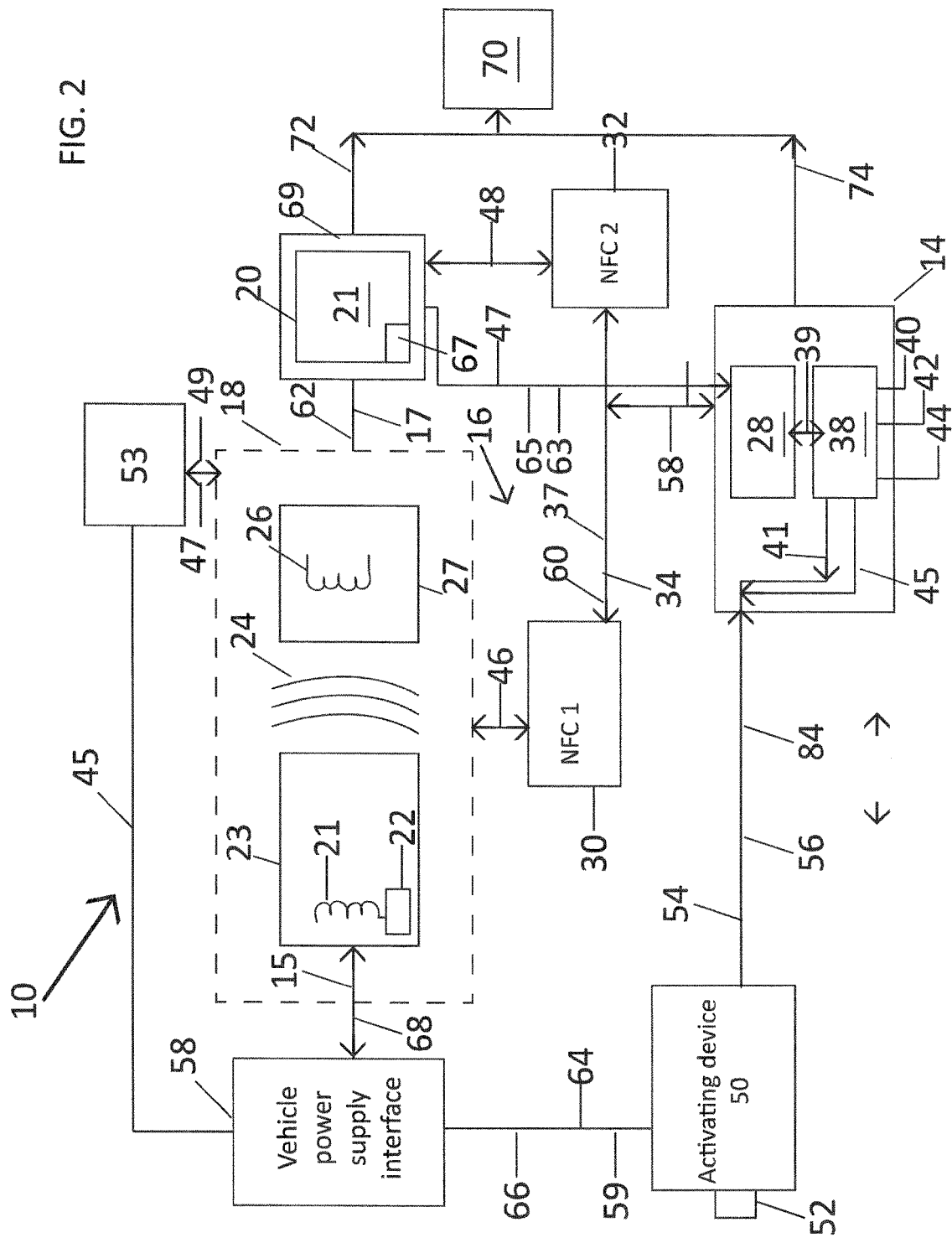
FIG. 2 presents details of communication links between the inductive power transfer unit with other members of the vehicle induction power assembly, in accordance with a selected embodiment of the present disclosure.

Reference is now made to FIG. 2, which presents details of communication links between the inductive power transfer unit 18 with other members of the vehicle induction power assembly 10, in accordance with a selected embodiment of the present disclosure.

The inductive power transfer unit 18 includes at least one primary inductor 21 and at least one driving unit 22 associated within an inductive power outlet unit 23. The power outlet unit 23 is inductively operable to generate a varying electrical potential across the at least one primary inductor 21 and is integrated to a vehicle charging frame. The power outlet unit 23 inductively couples 24 the at least one primary inductor 21 with a secondary inductor 26 of an inductive power receiver unit 27. The inductive power receiver unit 27 is associated and coupled to the electrical device 20 by the communications link 17 enabling the electrical power generated in the inductive power receiver unit 27 to be transferred to the electrical device 20.

The communications security system 14 includes, inter alia, a communications controller 28 which is in communications with a first Near-Field Communications device ($NFC_1$) 30 associated with the inductive power transfer system 18, a second Near-Field Communications device ($NFC_2$) 32 associated with the electrical device 20 and a communications channel 34. The communications channel 34 is a secure communications link within the secure communications channel 16 and securely links $NFC_1$ 30 and $NFC_2$ 32. The communications controller 28 controls a handshaking procedure 36 between the inductive power transfer system 18 and the electrical device 20 by means of the communications channel 34 and the $NFC_1$ 30 and the $NFC_2$ 32, as shown in FIG. 2. The $NFC_1$ 30 is linked to the inductive power transfer system 18 via a secure communications channel 46 and the $NFC_2$ 32 is linked to the mobile device 20 via a secure communications channel 48.

The secure communications channel 34 ensures that all communications between the inductive power transfer system 18 and the electrical device 20 are by means of a secure communications protocol, such as a Bluetooth protocol. The secure communications prevent the vehicle inductions power assembly 10 by pirate users.

The secure communications channel 16, such as a Bluetooth communications channel and the handshaking procedure 36 uses a Bluetooth protocol. Alternatively, the secure communications channel 16 and a corresponding protocol are selected from the group consisting of a WiFi communications channel, a LAN network channel and an Ethernet network channel.

The communications security system 14 also includes a data-transfer signal generator 38 for generating requisite signals for commencing operating and terminating operation of the inductive power transfer system 18, as described below. In addition, the data-transfer signal generator 38 generates a data-transfer commencement signal 40, a data-transfer proceeding signal 42 and a data-transfer termination signal 44, which are visually and/or audibly presented to a user of the power transfer system 18 by at least one external peripheral display device 70, as described below.

The vehicle induction power assembly 10 also includes an activation unit 50. The activation unit 50 is activated by the user of the power assembly 10 operating a switching unit 52. The switching unit 52 is selected from at least one of the following input devices: an electro-mechanical switch, a keyboard, a mouse, a touch screen, a pen device, a character recognition device, an optical recognition device, a voice recognition device and any combination thereof.

Optionally, the switching unit 52 is located on the dashboard of the vehicle 12 permitting easy operation of the power assembly 10 without distracting the driver's attention from driving the vehicle 12.

On activation of the activation unit 50 by the driver/user, the activation unit 50 forwards a commencement-of-operation signal 54 to the communications security system 14 via a communications link 56.

On reception of the signal 54 at the communications security system 14, the communications controller 28 initiates a handshake procedure 37 between the $NFC_1$ 30 and the $NFC_2$ 32 by forwarding a handshake protocol to the $NFC_1$ 30 and the NFC$_2$ 32 via the communications channels 19 and 34. A recognition protocol exchange 60 commences.

Following a successful handshake procedure 37, a secure link 62 is established between the inductive power transfer system 18 and the electrical device 20 by the communications link 17. The communications controller 28 instructs the data-transfer signal generator 38, via a communications link 39, to generate a data-transfer commencement signal 41 for forwarding to the activation device 50 via the communications channel 54.

Upon receiving the data-transfer commencement signal 41, the activation device 50 forwards an operation-commencement signal 64 to the vehicle power supply interface 58 via a communications channel 66 and the vehicle power supply interface 58 supplies electrical power 68 to the inductive power transfer system 18 for operation of the power transfer supply system 18. The power transfer system 18 proceeds to supply electrical power to the electrical device 20, as described above.

Concomitantly with the generation of the data-transfer commencement signal 41, the generator 38 also generates a further data-transfer commencement signal 40 for forwarding to the peripheral display device 70.

Alternatively, the vehicle induction power assembly 10 is activated by the user displacing the inductive power receiver unit 27 in a magnetically-inductive location in magnetic proximity to the inductive power outlet unit 23. The inductive power outlet unit 23 senses the presence of the receiver unit 27 and forwards a commencement of operation signal 15 to the vehicle power supply interface 58 to commence providing electrical power 68. The above handshaking procedure is repeated and the power transfer system 18 proceeds to supply electrical power to the electrical device 20, as described above.

Figure 3:
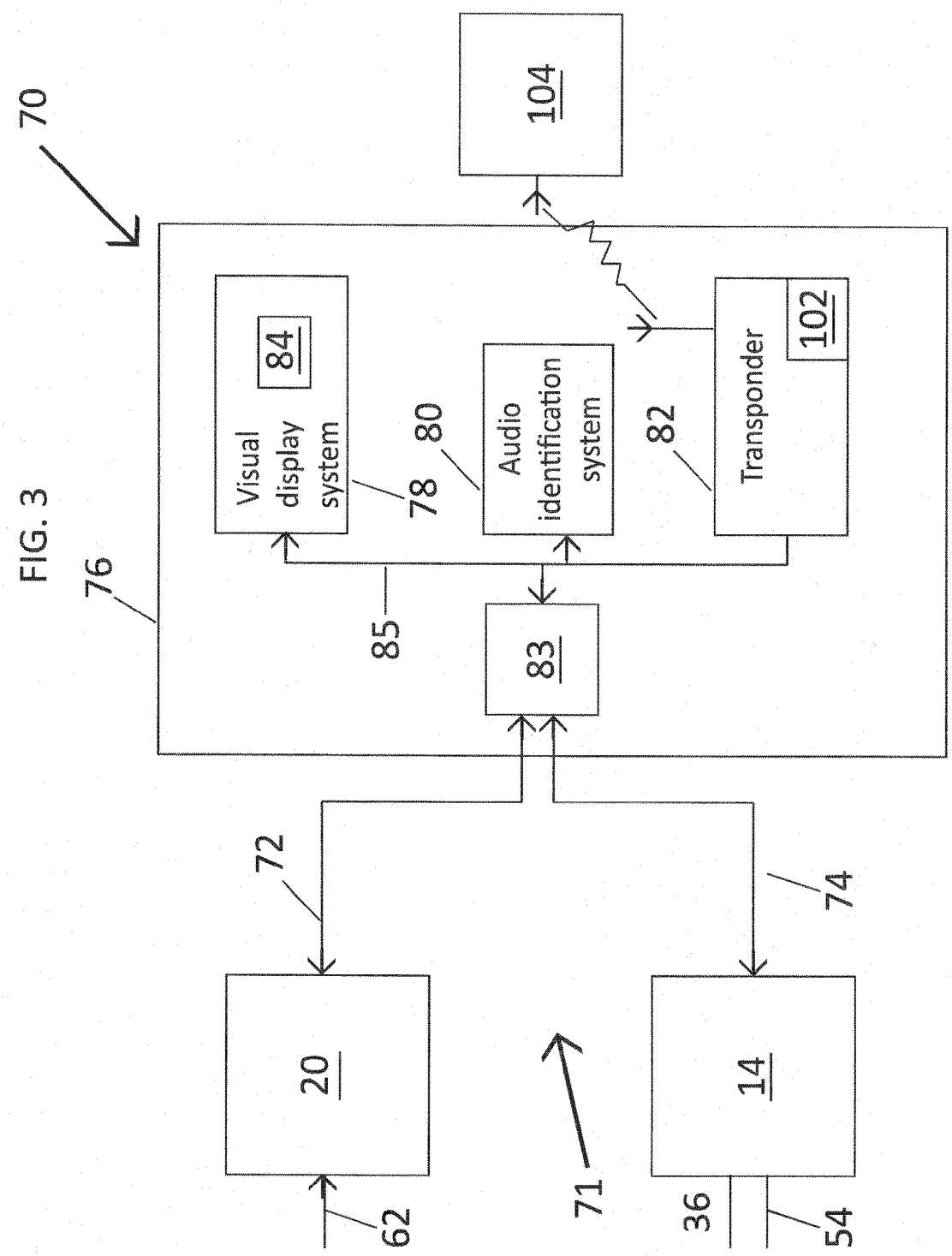
FIG. 3 shows communication links between the communications security system and the electrical device with the at least one external peripheral device, in accordance with a selected embodiment of the present disclosure.

It is appreciated that if the handshake procedure is unsuccessful, further operation of the communications security system terminates and the user is notified visually and/or audibly informed thereof by a vehicle communications notification device 76 (FIG. 3).

In order to terminate the operation of the power transfer supply system 18, the user deactivates the device 50 by appropriately operating the switching unit 52. The switching unit 52 forwards a stop-supply signal 59 to the vehicle power supply interface and the supply interface 58 ceases to apply electrical power 68 to the power outlet unit 23 and the transfer of electrical power to the electrical device 20 terminates.

Additionally or alternatively, termination of the supply of electrical power to the electrical device 20 is achieved by a safety monitoring device 53 which continually monitors the operation of the power transfer supply system 18. If the monitor senses that the electrical and/or temperature safety features of the system 18 are exceeded, the monitor device 53 ceases the operation of the power transfer supply system 18 by forwarding a stop-functioning signal 45 to the supply interface 58 as well as forwarding an appropriate visual/audio warning signal 47 to the display unit 21, via a communications link 49 of the electrical device 20 and to the display device 70, via a communications link 74.

Termination of the supply of electrical power to the electrical device 20 is also achieved by the user removing the electrical device 20 from a holding cradle 69. The removal of the electrical device 20 is detected by a contact sensor 67, located within the cradle 69. The cradle 69 forwards a break-contact signal 63 to the data-transfer controller 28 via the communications link 65. The communications controller 28 instructs the data-transfer signal generator 38 to generate a data-transfer termination signal 45. The generator 38 forwards the signal 45 to the activating device 50, via the communications channel 54. On reception of the data-transfer termination signal 45, the activating device 50 instructs the vehicle supply interface 58 to cease applying electrical power to the power outlet unit 23 and the power supply interface 18 ceases operation. The generator 38 also forwards a termination signal 44 to the display 21 and the external peripheral device 70.

Reference is now made to FIG. 3, which shows communicational links between the communications security system 14 and the electrical device 20 with the at least one external peripheral device 70, in accordance with a selected embodiment of the present disclosure. The communications security system 14 and the electrical device 20 are linked to the external peripheral device 70 by a secure communications channel 71, which includes at least secure communications links 72 and 74, respectively, as shown in FIG. 3.

The peripheral device 70 typically includes the vehicle communications notification device 76, which includes, inter alia, a visual display system 78, an audio notification system 80 and a transponder 82. The secure communications channel 71 links the electrical device 20 with the visual display unit 78, the audio notification unit 80 and the transponder 82 by means of a multiplexer 83. The visual display system 78, the audio notification system 80 and the transponder 82 are linked to the multiplexer 83 by a communications bus 85.

Referring also back to FIG. 2, the visual display system 78 includes, inter alia, a visual display 84, for example a touch screen, for visually displaying to the user of at least one data-transfer operation by means of at least one visual signal:

A "Commencing Signal" 40 notifying the user that the inductive power transfer system 18 is commencing to transfer electrical power to the electrical device 20; A "Proceeding Signal" 42 notifying the user that the inductive power transfer system 18 is in the process of transferring electrical power to the electrical device 20, and "A Terminating Signal" 44 notifying the user that the inductive power transfer system 18 is ceasing to transfer the electrical power to the electrical device 20.

The audio notification system 80 includes, inter alia, an audio signal generation system for additionally or alternatively audibly notifying the user of said at least one data-transfer operation, said at least one data transfer operation by means of at least one audio signal:

A "Commencing Signal" 90 notifying the user that the inductive power transfer system 18 is commencing to transfer electrical power to the electrical device 20; A "Proceeding Signal" 92 notifying the user that the inductive power transfer system 18 is in the process of transferring electrical power to the electrical device 20, and "A Terminating Signal" 94 notifying the user that the inductive power transfer system 18 is ceasing to transfer electrical power to the electrical device 20.

It is appreciated that the visual display system 78 operates asynchronously or concomitantly with the audio notification system 80.

In order for the user to be informed of the required information, such as the operational status of the power supply system 18, the user activates the requisite key or keys on the switching unit 52. Upon the user selecting the appropriate key or keys, the communications security system 14 establishes the secure communications channel 71 between the electrical device 20 and the communications notification device 76.

In accordance with the user's instructions, the multiplexer 83 selects the appropriate member and/or members of the communications notification device 76.

In addition, the visual display system 78 and/or the audio notification system 80 is enabled to notify the user of personalized driver information, such as favorite radio and TV stations, phonebook contact list and further information stored on the electrical device 20, such as a mobile communications device. In addition, the user is able to be notified of telephone call details from a mobile communication device by means of the visual display system 78 and/or the audio notification system 80. Furthermore, GPS data, such as addresses and map data, which are stored in the mobile communication device, are able to be decoded by the vehicle communications notification device 76 and utilized by a GPS device installed in the motorized vehicle 12.

Figure 4:
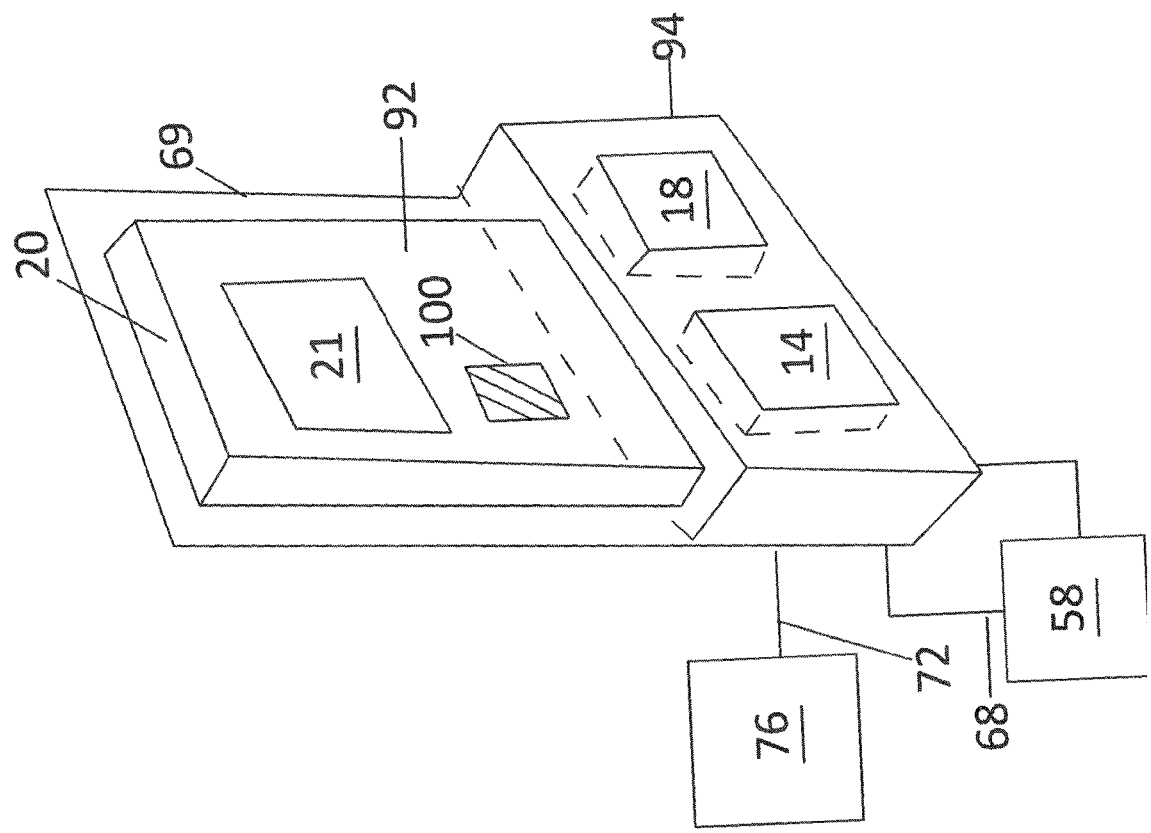
FIG. 4 shows a holding cradle for accommodating the electrical device, such as a mobile communications device, in accordance with a selected embodiment of the present disclosure.

Reference is now made to FIG. 4, which shows details of a possible holding cradle 69 for accommodating the electrical device 20, such as a mobile communications device 92, in accordance with a selected embodiment of the present disclosure. It is appreciated that the holding cradle 69 is suitably designed and constructed for accommodating a variety of selected electrical devices.

FIG. 4 shows that the inductive power transfer system 18 and the communications security system 14 are located on a base portion 94 of the cradle 69. The holding cradle 69 is suitably coupled to the vehicle communications device 76 by means of the communications channel 72 and is communicatively linked to the vehicle power supply interface 58 by means of the communications channel 68.

It is appreciated that the communications channel 72 and the communications channel 68 permit a two-way link between the cradle 69 and the vehicle communications device 76 and the vehicle power supply interface 68, respectively. Therefore, in addition, to the vehicle communications device notifying the user of data and parameters stored in the electrical device 20, the electrical device 20, such as the mobile communications device, is able to notify the user of relevant vehicle data and parameters.

The visual display 21 and an audio notification device 100 of the electrical device 20 notify the user, visually and audibly, respectively, of vehicle data, such as distance traveled, fuel consumption, speed data as well as a service-reminder to notify the user of vehicle-servicing dates.

In addition, in the event of a vehicle breakdown or an emergency, the vehicle may be able to provide data to the mobile communication device 92 enabling on-line troubleshooting, repair and/or servicing by the user and/or or profession technician.

Referring back to FIG. 3, the electrical device 20 is linked to the transponder by the communications bus 85. The transponder 82 includes a ciphering/deciphering transceiver unit 102 for transmitting relevant user data, such as identity number and/or social security number, the user's credit/debit card details and vehicle data, such as car licensing number, to a remote external device 104. The external device 104 includes, for example, a parking-lot system which monitors the arrival and departure of a vehicle from a paying-parking lot. The electrical device 20 records time-of-day and travel-distance of the vehicle 12, communicates this information to the transponder 82 via communications link 85. The transponder 82 communicates the information securely to the external device 104 and instructs the external device 104 to perform payment of the parking-lot. The payment of the travel tolls and parking-fees are enabled by forwarding the tolls and fees to the user's credit/debit card.

The transceiver unit 102 also receives appropriate data from the device 104, such as confirmation of the payment of the parking fee.

Reference is now made to FIGS. 5A and 5B, which present a flow chart 500 for a method for transferring electrical power from a vehicle induction power assembly to an electrical device, in accordance with a selected embodiment of the present disclosure.

In step 502, an inductive power transfer system is provided, configured to supply electrical power to the electrical device.

In step 504, a communications security system is provided, configured to establish a secure communications channel.

In step 506, a handshaking procedure is initiated between the inductive power transfer system and the electrical device via a secure communications channel.

In step 508, the inductive power transfer system is activated to supply the electrical power, to the electrical device.

In step 510, a data-commencement transfer signal is generated by the communications security system for forwarding to an activating device.

In step 512, a switching unit is activated for conductively linking a vehicle power supply interface to the inductive power transfer system.

In step 514, visually notifying the user of a data transfer operation.

In step 516, audibly notifying the user of a data transfer operation.

In step 518, the data transfer signal generator generating a data-transfer termination signal for forwarding to the power transfer system, following completion of the electrical charging operation.

Figure 6:
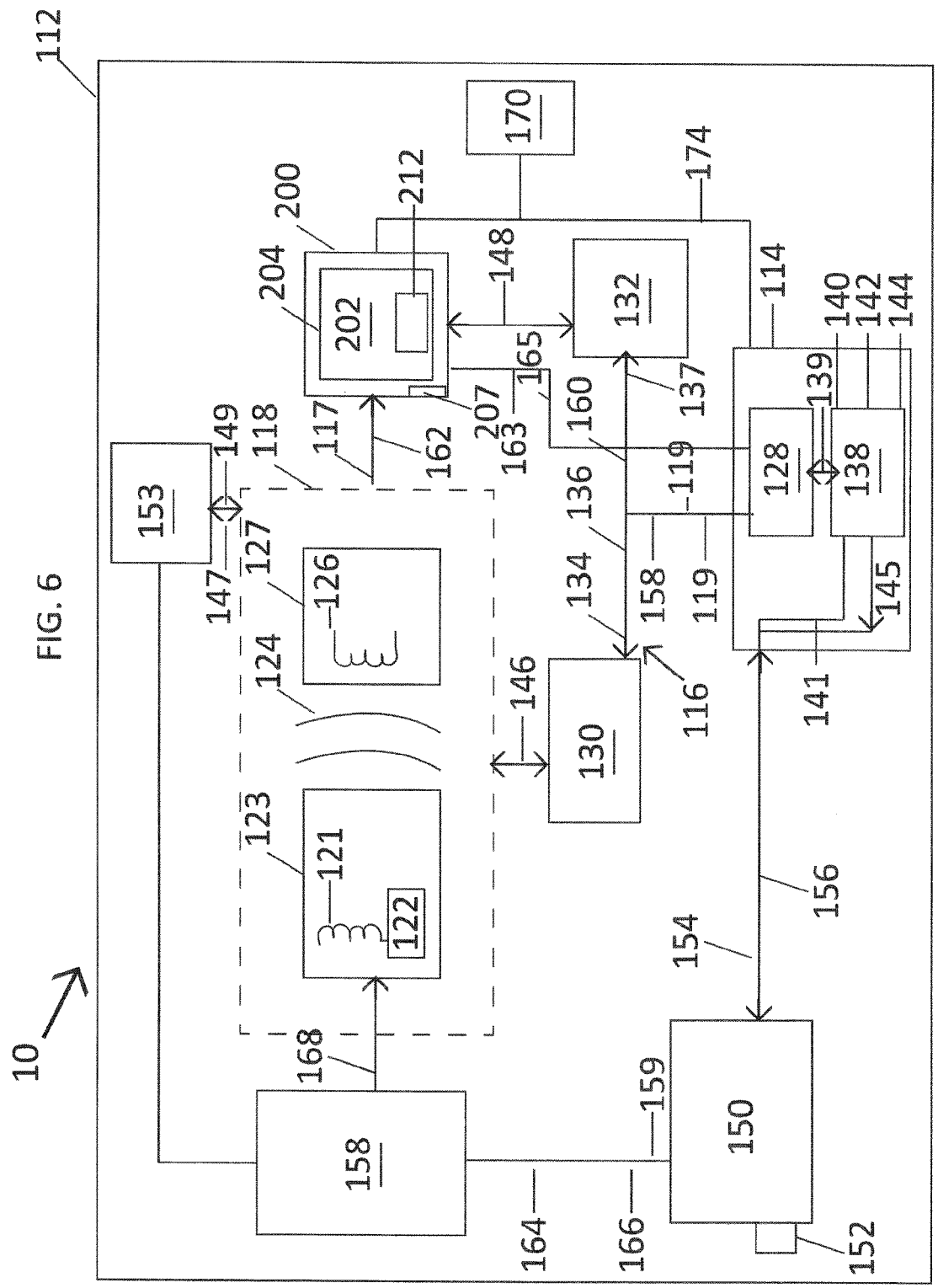
FIG. 6 shows the communication links between the inductive power transfer system and the electrical device accommodated in a vehicle inductive container, in accordance with another selected embodiment of the present disclosure.

Reference is now made to FIG. 6, which shows the coupling of the inductive power transfer system 118 for supplying electrical power to a vehicle inductive container 200, which is inductively integrated with an electrical device 202, in accordance with another selected embodiment of the present disclosure. FIG. 6 shows that the inductive power supply system 118 is coupled to the vehicle inductive container 200 and the inductive power supply system 118 provides electrical power to an electrical device 202 accommodated in an inductive electrical power platform 204, which is located in the container 200.

The vehicle induction power assembly 110 installed in a motorized vehicle 112, includes, inter alia, a communications security system 114 for establishing a secure communications channel 116 between the inductive power transfer unit 118 and the inductive container 200, enabling the inductive power transfer unit 118 to provide electrical power to the inductive container 200 by means of a communications link 117. The vehicle inductive container 200 inductively supplies electrical power to the electrical device 202, as described below.

The electrical device 202 typically includes a visual and/or an audio notification system 212 for informing a user of the status of the electrical transfer procedure as well as additional notifications, as described below.

The inductive power transfer unit 118 includes at least one primary inductor 121 and at least one driving unit 122 associated within an inductive power outlet unit 123. The power outlet unit 123 is inductively operable to generate a varying electrical potential across the at least one primary inductor 121 so as to inductively couple 124 the at least one primary inductor 121 and is integrated to a vehicle charging frame. The power outlet unit 123 inductively couples 124 the at least one primary inductor 121 with a secondary inductor 126 of an inductive power receiver unit 127. The inductive power receiver unit 127 is associated and coupled to the electrical device 120 by the communications link 117 enabling the electrical power generated in the inductive power receiver unit 127 to be transferred to the inductive container 200.

The communications security system 114 communicates with the secure communications channel 116 via a secure communications link 119. The communications security system 114 includes, inter alia, a communications controller 128 which is in communications with a first Near-Field Communications device ($NFC_1$) 130 associated with the inductive power transfer system 118, a second Near-Field Communications device ($NFC_2$) 132 associated with the electrical device 204 and a communications channel 134. The communications channel 134 is a secure communications link within the secure communications channel 116 and provides a secure link between $NFC_1$ 130 and $NFC_2$ 132.

Figure 5:
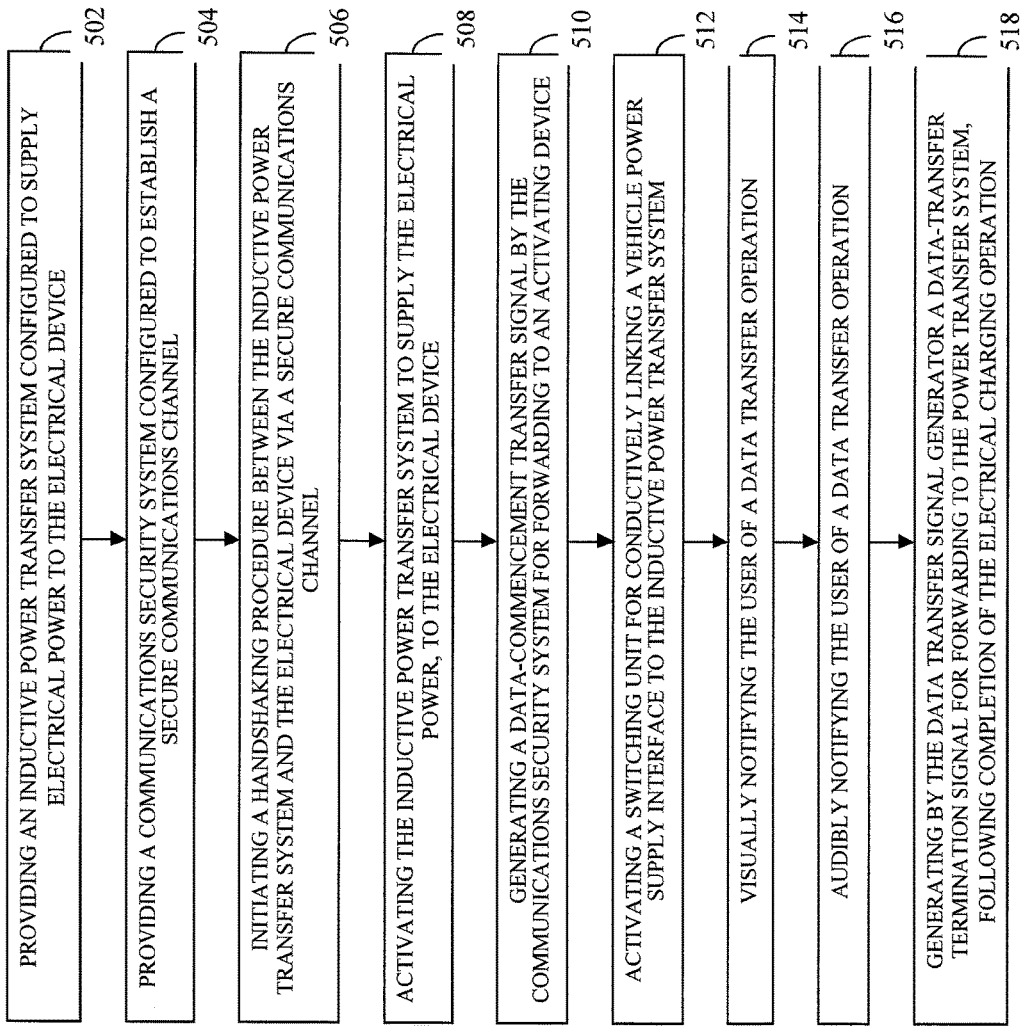
FIGS. 5A and 5B present a flow chart for a method for transferring electrical power from a vehicle induction power assembly to the electrical device, in accordance with a selected embodiment of the present disclosure.

The communications controller 128 controls a handshaking procedure 136 between the inductive power transfer system 118 and the electrical device 204 by means of the communications channel 134 and the $NFC_1$ 130 and the $NFC_2$ 132, as shown in FIG. 5. The $NFC_1$ 130 is linked to the inductive power transfer system 118 via a secure communications channel 146 and the $NFC_2$ 132 is linked to the mobile device 204 via a secure communications channel 148.

The secure communications channel 134, the secure communications channel 146 and the secure communications channel 148 ensure that all communications between the inductive power transfer system 118 and the electrical device 204 are secure in accordance with a secured protocol, such as a Bluetooth protocol. Thus, misuse of the vehicle inductions power assembly 110 by pirate users is prevented.

The secure communications channel 116 is a Bluetooth communications channel and the handshaking procedure 136 uses a secure Bluetooth protocol. Alternatively, the secure communications channel 116 and a corresponding protocol are selected from the group consisting of a WiFi communications channel, a LAN network channel and an Ethernet network channel.

The communications security system 114 also includes a data-transfer signal generator 138 for generating requisite signals for operating the inductive power transfer system 118, as described below. In addition, the data-transfer signal generator 138 generates a data-transfer commencement signal 140, a data-transfer proceeding signal 142 and a data-transfer termination signal 144, which are displayed to the user of the power transfer system 118 by at least one peripheral display device 170, as described below.

The vehicle induction power assembly 110 includes an activation unit 150 for activating the power transfer system 118. The activation unit 150 is activated by the user of the power assembly 110 by operating a switching unit 152. The switching unit 152 includes an input device, such as an electro-mechanical switch, a keyboard, a keypad, a mouse, a touch screen, a pen device a character recognition device, an optical recognition device, a voice recognition device and any combination thereof.

Optionally, the switching unit 152 is located on the dashboard of the vehicle 112 permitting easy operation of the vehicle induction power assembly 110 without distracting the user attention from driving the vehicle 112.

On activation of the activation unit 150 by a user, the activation unit 150 forwards a commencement-of-operation signal 154 to the communications security system 114 via a communications link 156.

On reception of the signal 154 at the communications security system 114, the communications controller 128 initiates a handshake procedure 137 between the $NFC_1$ 130 and the $NFC_2$ 132 by forwarding a handshake protocol to the $NFC_1$ 130 and the $NFC_2$ 132 via the communications channels 119 and 134. A recognition protocol exchange 160 commences.

Following a successful handshake procedure 137, a secure link 162 is established between the inductive power transfer system 118 and the electrical device 120 by the communications link 117. The communications controller 128 instructs the data-transfer signal generator 138, via a communications link 139, to generate a data-transfer commencement signal 141 for forwarding to the inductive power transfer system 118 via the communications channel 154 to the activation device 150.

Upon receiving the data-transfer commencement signal 141, the activation device 150 forwards an operation-commencement signal 164 to the vehicle power supply interface 158, via a communications channel 166 and the vehicle power supply interface 158 provides electrical power 168 to the inductive power transfer system 118 for operation of the power transfer supply system 118. The power transfer system 118 proceeds to supply electrical power to the inductive container 200.

Concomitantly with the generation of the data-transfer commencement signal 141, the generator 138 also generates a further data-transfer commencement signal 140 for forwarding to the peripheral display device 170.

In order to terminate the operation of the power transfer supply system 118, the user deactivates the device 150 by appropriately operating the switching unit 152. The switching unit 152 forwards a stop-supply signal 159 to the vehicle power supply interface 158 and the supply interface 158 ceases to apply electrical power to the power outlet unit 123 and the supply of electrical power to the container 200 terminates.

Additionally or alternatively, termination of the supply of electrical power to the container 200 is achieved by a safety monitoring device 153 continually monitoring the operation of the power transfer supply system 118. If the monitor 153 senses that the electrical and/or temperature safety features of the system 118 are exceeded, the monitor device 153 ceases the operation of the power transfer supply system 118 by means of a communication link 149. In addition, the monitor 153 forwards an appropriate visual/audio warning signal 147 to the display unit 212, via the communications link 149 of the container 200 as well as to the display device 170, via a communications link 174.

Furthermore, termination of the supply of electrical power to the electrical device 204 is achieved by the user removing the platform 202. The removal of the electrical device 204 is detected by a contact sensor 207, located on the platform 202. The container 200 forwards a break-contact signal 163 to the data-transfer controller 128 via the communications link 165. The communications controller 128 instructs the data-transfer signal generator 138 to generate a data-transfer termination signal 145. The generator 138 forwards the signal 145 to the activating device 150, via the communications channel 154. On reception of the data-transfer termination signal 145, the activating device 150 instructs the vehicle supply interface 158 to cease applying electrical power to the power outlet unit 123 and the power supply interface 118 ceases operation. The generator 138 also forwards a termination signal 144 to the display 204 and the peripheral device 170.

Figure 7:
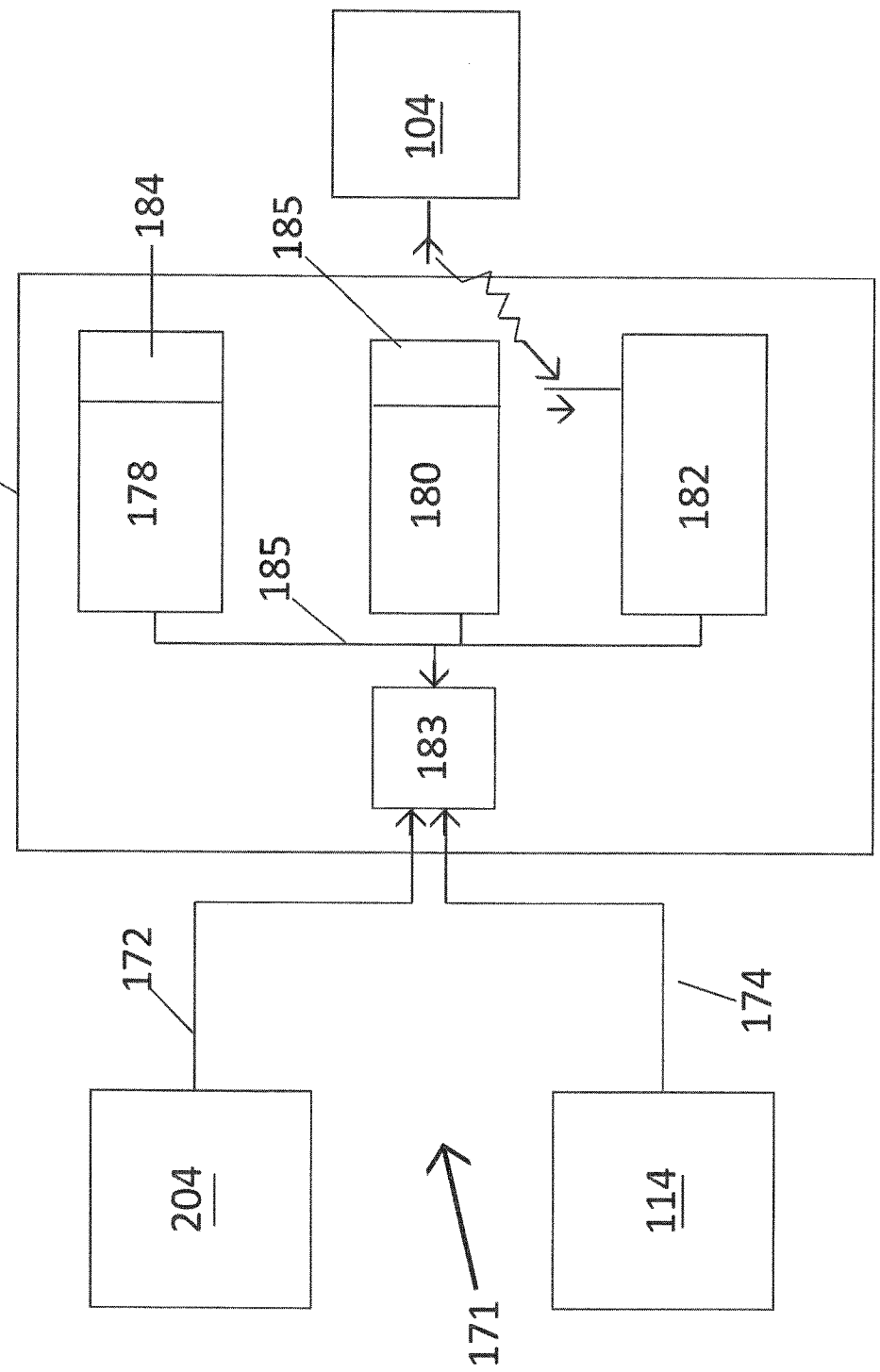
FIG. 7 shows communication links between the communications security system and the electrical device with an external peripheral device, in accordance with another selected embodiment of the present disclosure.

Reference is now made to FIG. 7, which shows communication links between the communications security system 114 and the electrical device 202 with the peripheral device 170, in accordance with another selected embodiment of the present disclosure. The communications security system 114 and the electrical device 202 are linked to the peripheral device 170 by a secure communications channel 171, which includes at least secure communications links 172 and 174, respectively, as shown in FIG. 6.

The peripheral device 170 includes a vehicle communications notification device 176, which includes, inter alia, a visual display system 178, an audio notification system 180 and a transponder 182. The secure communications channel 171 links the container 200 with the visual display unit 178, the audio notification unit 180 and the transponder 182 by means of a multiplexer 183. The visual display system 178, the audio notification system 180 and the transponder 182 are linked to the multiplexer 183 by a communications bus 185.

The visual display system 178 includes, inter alia, a visual display 184 for visually displaying to the user of at least one data-transfer operation by means of at least one visual signal:

The "Commencing Signal" 140 notifying the user that the inductive power transfer system 118 is commencing to transfer electrical power to the inductive container 200; The "Proceeding Signal" 142 notifying the user that the inductive power transfer system 118 is in the process of transferring electrical power to the container 200 and The "Terminating Signal" 144 notifying the user that the inductive power transfer system 118 is ceasing to transfer electrical power to the container 200.

The audio notification system 180 includes, inter alia, an audio signal generation system 185 for audibly notifying the user of at least one data-transfer operation by means of at least one audio signal:

A "Commencing Signal" 190 notifying the user that the inductive power transfer system 18 is commencing to transfer electrical power to the container 200; A "Proceeding Signal" 192 notifying the user that the inductive power transfer system 118 is in the process of transferring electrical power to the container 200 and A "Terminating Signal" 194 notifying the user that the inductive power transfer system 118 is ceasing to transfer electrical power to the container 200.

It is appreciated that the visual display system 178 operates asynchronously or concomitantly with the audio notification system 180.

In order for the user to be informed of the required information, such as the operational status of the power assembly 110, the user activates the requisite key or keys on the switching unit 152. Upon the user selecting the appropriate key or keys, the communications security system 114 establishes the secure communications channel 171 between the container 200 and the communications notification device 176.

In accordance with the user's instructions, the multiplexer 183 selects the appropriate member and/or members of the communications notification device 176.

Reference is now made to FIG. 8, which presents a cross-sectional view of the inductive container 200 for accommodating the electrical device 202, such as a mobile communications device, in accordance with another selected embodiment of the present disclosure. It is appreciated that the inductive container 200 is suitably designed and constructed for accommodating alternatively selected electrical devices.

FIG. 8 shows the inductive container 200 includes, inter alia, a base portion 220 and a side wall 224 with an upper lip 226. The base portion 220 is electrically coupled to the power supply system 118 by means of communication link 117. The container 200 may be configured to reside in a vehicle drinking-mug holder 228 and may be held in its docking position by means of spring clips 230. The inductive container 200 includes a slopped-supporting platform 232 for supporting the electrical device 202 within the container 200.

The container 200 includes, inter alia, the inductive outlet unit 123, which is associated within the supporting platform member 232 and is inductively coupled to the inductive power receiver unit 127 of the electrical device 202. The communications security system 114 is located in the supporting platform 232. Thus, on positioning the electrical device 202 in the platform 232, electrical power is inductively transferred to the electrical device 202.

Reference is now made to FIG. 9, which presents details of the power platform 204, in accordance with another selected embodiment of the present disclosure. The platform 204 is positioned on the support member 232 and includes, inter alia a grooved back support 234 and side-walls 236 for aligning and supporting the electrical device 202 when placed in the container 200. The platform 204 is constructed of magnetic permeable material permitting an inductive link between the power outlet unit 123 and the electrical device 202. A base portion 238 of the platform 202 the device 204 ensures that the electrical device 202 is held in position on the platform 202 in order to maintain inductive contact with the power outlet unit 123.

Figure 10:
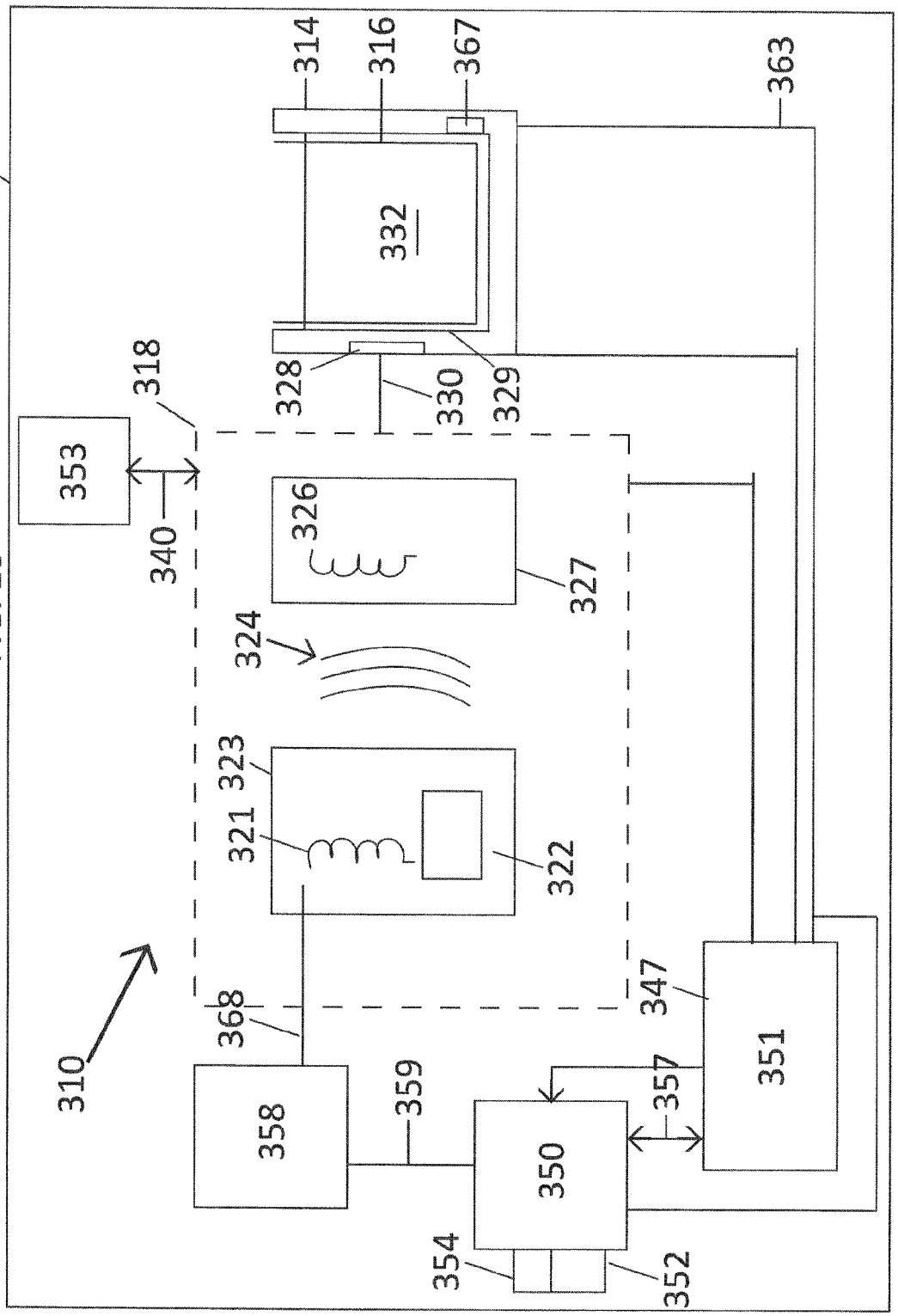
FIG. 10 shows a vehicle induction power assembly installed in a motorized vehicle for supplying electrical power to a thermal cup containing a beverage container, in accordance with another selected embodiment of the present disclosure.

Reference is now made to the block diagram of FIG. 10, which schematically shows a vehicle induction power assembly 310 installed in a motorized vehicle 312 for supplying electrical power to a thermal cup 314 containing a beverage container 316, in accordance with a further selected embodiment of the present disclosure. The power assembly 310 includes, inter alia, an inductive power transfer unit 318 for inductively supplying electrical power to the thermal cup 314.

The inductive power transfer unit 318 includes at least one primary inductor 321 and at least one driving unit 322 associated within an inductive power outlet unit 323. The power outlet unit 323 is associated with a vehicle charging frame and is inductively operable to generate a varying electrical potential across the at least one primary inductor 321 so as to inductively couple 324 the at least one primary inductor 321 with a secondary inductor 326 of an inductive power receiver unit 327. The inductive power transfer unit 318 is coupled to a thermoelectric unit 328 associated with the thermal cup 314 by means of an electrically conductive link 330. The power unit 318 provides electrical power to the thermal cup 314 for heating/cooling of a beverage 332 contained in the beverage container 316, which is placed in the thermal cup 314.

The vehicle induction power assembly 310 includes an activation unit 350 and a switching unit 352 for activating the power transfer system 318. The activation unit 350, which is associated with the vehicle 312, is activated by the user of the power assembly 310 operating the switching unit 352. The switching unit 352 includes an input device 351 for activating the unit 350. The user selects on the activating unit 350 the required operation of the thermal cup 314, either heating the beverage 332, cooling the beverage 332, maintaining the beverage 332 temperature at a required beverage temperature and/or maintaining the beverage 332 at its current temperature.

Optionally, the activation unit 350 and the switching unit 352 are located on the dashboard of the vehicle 312 permitting easy operation of the thermal cup 314 without distracting the user attention from driving the vehicle 312.

A visual/audio notification device 351 is connected to the activation device 350 and is Optionally located on the dashboard of the vehicle 312. The device 351 notifies the user of the operational status of the thermal cup 314, the temperature of the beverage 332 or whether the heating operation, the cooling operation or the temperature maintaining operation was selected.

On activation of the activation unit 350 by a user, the activation unit 350 forwards a commencement-of-operation signal 354 to a vehicle power supply interface 358 to commence supplying electrical power 368 to the inductive power transfer system 318. The power transfer system 318 proceeds to supply electrical power to the thermoelectric element 328. A thermostat 329 located between an inner wall of the thermal cup 314 records the temperature of the beverage container 316, adjusts the recorded temperature for the heat transfer across the beverage container 316 and forwards this information to the user notification device 351.

If the recorded temperature is compatible with the user required temperature, the device 351 forwards an appropriate signal 357 to the activation unit 350. The activation unit 350 forwards a stop-supply signal 359 to the supply interface 358 and the supply interface 358 ceases to apply electrical power to the power outlet unit 323 and the supply of electrical power to the thermal cup 314 terminates.

The thermostat 329 continually checks the beverage temperature. If the recorded temperature changes from the required temperature, the thermostat 329 forwards an appropriate signal to the activation device 350. The activation device 350 forwards a further commencement-of-operation signal to the power interface 358 and the heating/cooling process recommences. The activation device 351 appropriately notifies the user thereof.

The power transfer system continues to supply electrical power to the thermal cup 314 until the recorded temperature is compatible with the selected temperature.

Alternatively, the user deactivates the device 350 by appropriately operating the switching unit 352 and the device 350 forwards a stop-supply signal 359 to the vehicle power supply interface 358.

Additionally or alternatively, termination of the supply of electrical power to the thermal cup 314 is achieved by a safety monitoring device 353 which continually monitors the operation of the power transfer supply system 318. If the monitor senses that the electrical and/or temperature safety features of the system 318 are exceeded, the monitor device 353 ceases the operation of the power transfer supply system 318 and forwards an appropriate visual/audio warning signal 347 to the activation unit 350 as well as to the display unit 351.

Furthermore, termination of the supply of electrical power to the thermal cup 314 is achieved by the user removing the beverage container 316 from the thermal cup 314. The removal of the beverage container 316 is detected by a contact sensor 367, located on the inner wall of the thermal cup 314. The cup 314 forwards a break-contact signal 363 to the activation device 350 and the notification unit 351 notifies the user thereof. The activation device 350 generates and forwards the stop-supply signal 359 to the vehicle supply interface 358 to cease supplying electrical power 368 to the power outlet unit 323 and the power supply interface 318 ceases operation.

Figure 11:
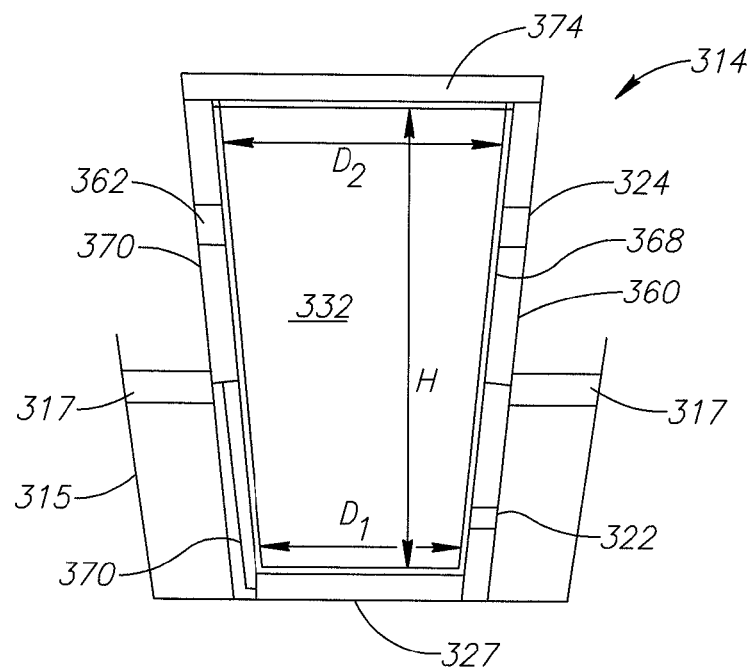
FIG. 11 presents a cross-sectional view of the thermal cup accommodated in a vehicle beverage holder, in accordance with another selected embodiment of the present disclosure.

Reference is now made to FIG. 11, which presents a cross-sectional view of the thermal cup 314 accommodated in a vehicle beverage holder 315, in accordance with another selected embodiment of the present disclosure. The thermal cup 314 is supported in the beverage holder 315 by means of spring clips 317.

The thermal cup 314 includes, inter alia, an outer wall 360 typically constructed of stainless steel and an inner wall 362 constructed of a heat conducting material, such as aluminum. A thermal insulating layer 368, made of a thermal insulating material, such as polyurethane, is located between the outer wall 360 and the inner wall, providing a thermal insulator for the beverage 332 contained in the container 316. The thermal cup 314 is a closed unit without air ventilation apertures, thereby providing high thermal insulation of the beverage container 316.

A thermoelectric element 370 is integrated with the thermal cup 314 and is typically located between the inner wall 362 and the outer wall 360. The thermoelectric element 370 is coupled to the power receiver unit 327 by means of the conducting link 372. The thermoelectric element 370 is operative to thermally condition the beverage 332 by heating, cooling or maintaining the beverage 332 at a required beverage temperature. In addition, the thermal cup 314 includes a switching unit 374 for the user to select the required thermal conditioning status. The user selects at least one of the following thermal conditions: heating the beverage to the required beverage temperature; cooling the beverage to the required beverage temperature; maintaining the beverage temperature at the required beverage temperature and/or maintaining the beverage temperature at a current beverage temperature.

The inner dimensions of the beverage container 316 are selected such that a standard beverage-can or a standard hot-cup can be supported in the beverage container 316 during the thermal conditioning operation. Typical dimensions of the beverage container 316 are:

Height, H: 140 mm;
Lower diameter, D1: 60 mm, and
Upper diameter, D2: 90 mm.

The thermal cup 314 also includes a sealing cap 374 for sealing beverage container 316 within the cup 314, such that the thermal conditions of the beverage are maintained. In addition, the cup components are sealed between the outer wall 360 and inner wall 362 thereby facilitating cleaning of the thermal cup 314 and maintaining the hygiene of the cup 314.

Figure 12:
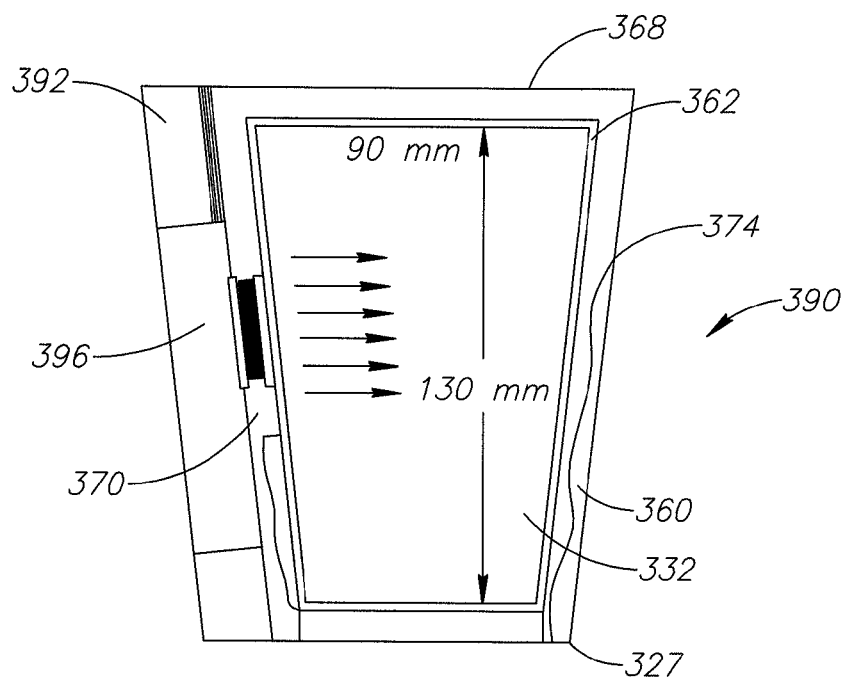
FIG. 12 shows a thermal cup including an air channel for providing cooling air to a heat sink, in accordance with another selected embodiment of the present disclosure.

Reference is now made to FIG. 12, which shows a thermal cup 390 including an air channel 392 for providing cooling air 394 to a heat sink 396, in accordance with a further selected embodiment of the present disclosure. In FIG. 12, like elements have the same reference numerals as those of the embodiment described above with respect to FIG. 11. The heat sink 396 is associated with the thermoelectric member 370 and provides the heat sink for dissipating heat generated by the thermoelectric member 370 during its operation. In addition, the thermal cup 390 includes an air channel 392 for applying cooling air to the heat sink 396 for cooling of the heat sink 396 and the thermoelectric element 370 for dissipating heat generated by the thermoelectric device 406.

Figure 13:
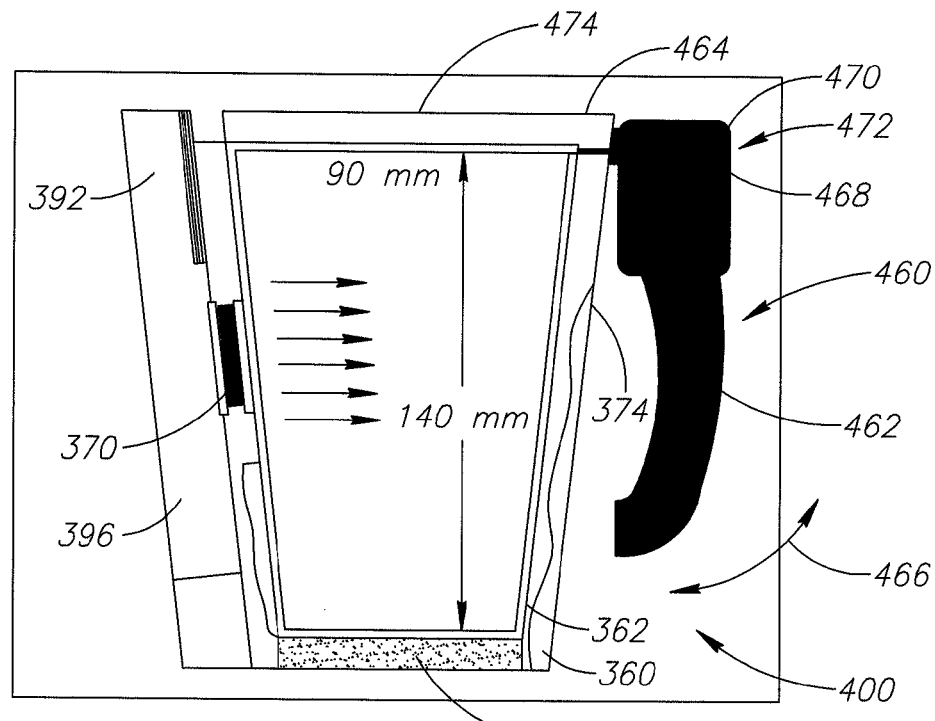
FIG. 13 a thermal cup including a pivotable gripping-handle including an air channel for providing cooling air to the heat sink, in accordance with another selected embodiment of the present disclosure.

Reference is now made to FIG. 13, which shows a thermal cup 400 including a pivotable gripping-handle 460, in accordance with a further selected embodiment of the present disclosure. In FIG. 13, like elements have the same reference numerals as those of the embodiment described above with respect to FIG. 12. The pivotable gripping-handler 460 includes, inter alia, an air channel 464 for providing cooling air 454 to the heat sink 396.

The air channel 464 provides cooling air 454 to the heat sink 396 enabling dissipation of heat generated by the thermoelectric device 370 during operation of the thermoelectric device 370.

In the embodiment shown in FIG. 13, the gripping-handle 460 includes a holding portion 462 and a pivotable lid 464 pivotable about a pivot 468. The pivoatble lid 464 thermally seals the thermal cup 400 from the environment, thus maintaining the beverage at the required temperature. The user attaches and/or detaches the gripping handle 460 by lowering or raising the hand portion 462, respectively, as indicated by a direction arrow 466. The pivot 468 provides a rotational axis for the handle 460. An air fan 470 is located within the pivot 468, as shown in FIG. 12. The air fan draws-in ambient air 472 and pumps the air 472 into the air channel 474. The air channel 474 is fluidly coupled to the air channel 392 and provides the cooling air 454 to the heat sink 396.

Figure 14:
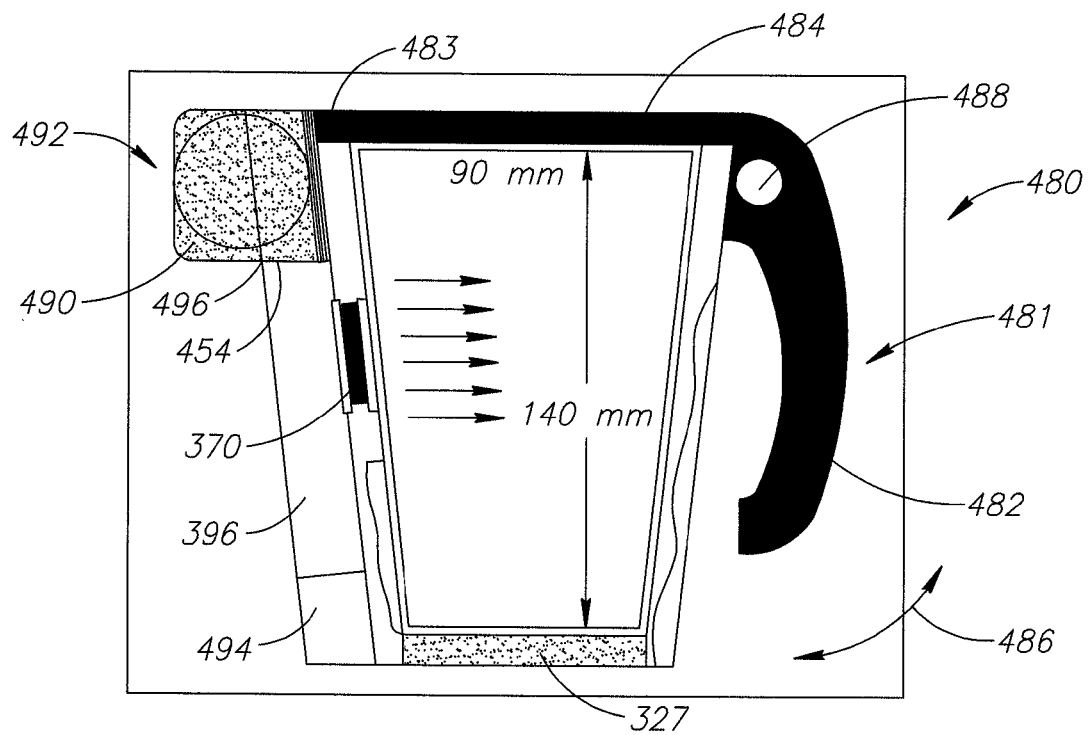
FIG. 14 shows a thermal cup including a gripping handle, in accordance with another selected embodiment of the present disclosure.

Reference is now made to FIG. 14, which shows a thermal cup 480 including a gripping handle 481, in accordance with yet a further embodiment of the present disclosure. In FIG. 13, like elements have the same reference numerals as those of the embodiment described above with respect to FIG. 11.

The embodiment shown in FIG. 14, includes, inter alia a gripping handle 481, a hand-holding portion 482 and a lid portion 484. The user attaches and/or detaches the gripping handle 480 by lowering or raising the hand portion 482, respectively, as indicated by a direction arrow 486, as is known in the art.

A pivot 488 provides a rotational axis for the handle 481. An air fan 490, located at a distal end 483, draws-in ambient air 492 and pumps cooling 492 into the air channel 496. The air channel 496 is fluidly coupled to the air channel 494 and provides cooling air 454 to the heat sink 396.

In the foregoing description, embodiments of the disclosure, including selected embodiments, have been presented for the purpose of illustration and description. They are not intended to be exhaustive or to limit the disclosure to the precise form disclosed. Obvious modifications or variations are possible in light of the above teachings. The embodiments were chosen and described to provide the best illustration of the principals of the disclosure and its practical application, and to enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth they are fairly, legally, and equitably entitled.

The invention claimed is:

1. A vehicle induction power assembly for transferring electrical power inductively to an electrical device comprising:
    an inductive power transfer system configured to provide the electrical power to the electrical device, and
    a communications security system configured to establish a secure communications channel between said inductive power transfer system and the electrical device,
    wherein upon activating said inductive power transfer system, said communications security system initiates a handshaking procedure between said inductive power transfer system and the electrical device, whereupon if said handshaking procedure is successful, said communications security system instructs said inductive power transfer system to commence providing the electrical power to the electrical device, wherein the vehicle induction power assembly further comprises a transponder coupled to a vehicle communications notification device and a vehicle service provider for facilitating payment of vehicle usage fees, said vehicle service provider being selected from the group consisting of a parking lot fee provider, a vehicle road toll provider, and any combination thereof.

2. The vehicle induction power assembly according to claim 1, wherein said communications security system comprises a data transfer signal generator for generating a data transfer commencement signal.

3. The vehicle induction power assembly according to claim 2, wherein said secure communications channel comprises a secure data transfer channel for transferring a data transfer commencement signal from a data transfer signal generator to said inductive power transfer system.

4. The vehicle induction power assembly according to claim 3, wherein said communications security system comprises:
    a first NFC tag associated with said inductive power transfer system, said inductive power transfer system comprising at least one primary inductor and at least one driving unit, said driving unit being operable to generate a varying electrical potential across said primary inductor and said primary inductor being configured to inductively couple with a secondary inductor associated with the electrical device such that the electrical power is transferred to the electrical device; and
    a second NFC tag associated with the electrical device, wherein said first NFC tag and said second NFC tag perform said handshaking procedure between said inductive power transfer system and the electrical device.

5. The vehicle induction power assembly according to claim 4, wherein following the successful handshake between said first NFC tag and said second NFC tag, said communications security system instructs said data transfer signal generator to generate said data transfer commencement signal.

6. The vehicle induction power assembly according to claim 4, wherein said activating comprises locating an inductive power receiver unit in magnetically-inductive proximity to an inductive power outlet unit whereupon said inductive power transfer system generates said electrical power.

7. The vehicle induction power assembly according to claim 1, wherein said activating comprises a user activating a switching unit for conductively linking a vehicle power supply to said inductive power transfer system whereupon said inductive power transfer system generates the electrical power.

8. The vehicle induction power assembly according to claim 1, wherein the vehicle induction power assembly further comprises a vehicle communications notification device for notifying a user of at least one data transfer operation.

9. The vehicle induction power assembly according to claim 8, wherein said vehicle communications notification device comprises a visual display system for visual notification of said at least one data transfer operation, said at least one data transfer operation comprising at least one of the following:

commencing providing electrical energy to the electrical device;
proceeding providing electrical energy to the electrical device; and
terminating providing electrical energy to the electrical device.

10. The vehicle induction power assembly according to claim 8, wherein said vehicle communications notification device comprises an audio signal generation system for audible notifying a user of said at least one data transfer operation, said at least one data transfer operation comprising at least one of the following:
commencing providing the electrical energy to the electrical device;
proceeding providing the electrical energy to the electrical device; and
terminating providing the electrical energy to the electrical device.

11. The vehicle induction power assembly according to claim 2, wherein following completion of the electrical charging operation, said data transfer signal generator generates a data transfer termination signal for transferring to said inductive power transfer system via said secure data transfer channel.

12. The vehicle induction power assembly according to claim 8, wherein said at least one data transfer operation comprises transferring at least one of the following data: a vehicle location, vehicle registration data, a vehicle travel log, vehicle servicing data, user identity data, user health data, and any combination thereof.

13. The vehicle induction power assembly according to claim 1, wherein the electrical device is selected from the group consisting of: a mobile communications device, a vehicle inductive power transfer container, a vehicle inductive thermal cup, an onboard fan, a navigation system, a handsfree microphone, a computer, a cooler unit and any combination thereof.

14. The vehicle induction power assembly according to claim 13, wherein the electrical device is accommodated in a holding sleeve.

15. The vehicle induction power assembly according to claim 13, wherein the electrical device is accommodated in an inductive holding container.

16. The vehicle induction power assembly according to claim 1, wherein said secure communications channel is selected from the group consisting of a Bluetooth communications channel, a WiFi communications channel, a LAN network channel and an Ethernet network channel.

17. A method for transferring electrical power from a vehicle induction power assembly to an electrical device comprising:
providing an inductive power transfer system configured to supply the electrical power to the electrical device;
providing a communications security system configured to establish a secure communications channel between said inductive power transfer system and the electrical device;
initiating a handshaking procedure between said inductive power transfer system and the electrical device via a secure communications channel;
activating said inductive power transfer system to supply the electrical power to the electrical device if said handshaking procedure is successful; and
coupling a transponder to a vehicle communications notification device for facilitating payment of vehicle usage fees by a user.

18. The method for transferring electrical power according to claim 17 further comprising:
generating a data-commencement transfer signal by said communications security system for forwarding to an activating device.

19. The method for transferring electrical power according to claim 17 further comprising:
locating an inductive power receiver unit in magnetically-inductive proximity to an inductive power outlet unit for generating the electrical power.

20. The method for transferring electrical power according to claim 17 further comprising:
activating a switching unit for conductively linking a vehicle power supply to said inductive power transfer system thereby supplying the electrical power to the electrical device.

21. The method for transferring electrical power according to claim 17 further comprising:
visually notifying a user in a vehicle notification device of at least one of the following data transfer operations:
commencing providing the electrical energy to the electrical device;
proceeding providing the electrical energy to the electrical device; and
terminating providing the electrical energy to the electrical device.

22. The method for transferring electrical power according to claim 17 further comprising:
audibly notifying a user in a vehicle notification device of at least one of the following data transfer operations:
commencing providing the electrical energy to the electrical device;
proceeding providing the electrical energy to the electrical device; and
terminating providing the electrical energy to the electrical device.

23. The method for transferring electrical power according to claim 22 further comprising:
generating by said data transfer signal generator a data-transfer termination signal for forwarding to said power transfer system, following completion of said electrical charging operation, instructing said electrical power to terminate said electrical power generation.

24. The method for transferring electrical power according to claim 17 wherein the electrical device is selected from the group consisting of: a mobile communications device, a vehicle inductive power transfer container, a vehicle inductive thermal cup, an onboard fan, a navigation system, a hands-free microphone, a computer, a cooler unit and any combination thereof.

* * * * *